(12) United States Patent
Yeh et al.

(10) Patent No.: US 7,546,226 B1
(45) Date of Patent: *Jun. 9, 2009

(54) ARCHITECTURE FOR AUTOMATING ANALYTICAL VIEW OF BUSINESS APPLICATIONS

(75) Inventors: Adam Yeh, Bellevue, WA (US); Jonathan Tang, Bellevue, WA (US); Alvin Lo, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 753 days.

This patent is subject to a terminal disclaimer.

(21) Appl. No.: 10/748,391

(22) Filed: Dec. 30, 2003

Related U.S. Application Data

(63) Continuation-in-part of application No. 10/727,176, filed on Dec. 3, 2003, now Pat. No. 7,313,561, and a continuation-in-part of application No. 10/725,665, filed on Dec. 2, 2003, and a continuation-in-part of application No. 10/386,633, filed on Mar. 12, 2003, now Pat. No. 7,275,024.

(51) Int. Cl.
*G06F 17/10* (2006.01)
*G06F 7/00* (2006.01)
(52) U.S. Cl. .................. 703/2; 707/1; 707/10; 717/108; 703/13; 703/17; 703/21
(58) Field of Classification Search .................. 703/13, 703/21, 2, 17; 707/2, 4, 10, 100, 1; 705/7, 705/27, 39; 715/811; 717/104, 108
See application file for complete search history.

(56) References Cited

U.S. PATENT DOCUMENTS

| | | | |
|---|---|---|---|
| 5,499,371 A | 3/1996 | Henninger et al. | 395/700 |
| 6,101,502 A | 8/2000 | Heubner et al. | 707/103 |
| 6,173,439 B1 | 1/2001 | Carlson et al. | 717/1 |
| 6,212,524 B1 | 4/2001 | Weissman et al. | 707/101 |
| 6,360,223 B1 | 3/2002 | Ng et al. | 707/100 |
| 6,609,123 B1 * | 8/2003 | Cazemier et al. | 707/4 |
| 6,665,644 B1 | 12/2003 | Kanevsky et al. | 704/275 |
| 6,704,744 B1 | 3/2004 | Williamson et al. | 707/103 |
| 6,807,518 B1 | 10/2004 | Lang | 703/2 |
| 6,862,574 B1 | 3/2005 | Srikant et al. | 705/10 |
| 6,907,433 B2 | 6/2005 | Wang et al. | 707/104 |
| 6,964,023 B2 | 11/2005 | Maes et al. | 715/811 |
| 6,980,980 B1 * | 12/2005 | Yeh | 707/2 |
| 7,007,029 B1 | 2/2006 | Chen | 707/100 |
| 7,111,010 B2 | 9/2006 | Chen | 707/102 |
| 7,185,016 B1 * | 2/2007 | Rasmussen | 707/100 |
| 2002/0070953 A1 | 6/2002 | Barg et al. | 345/700 |

(Continued)

OTHER PUBLICATIONS

Office Action for U.S. Appl. No. 10/727,176. Mailed Jun. 27, 2006.
U.S. Appl. No. 10/386,633 Office Action mailed Jun. 21, 2006.

(Continued)

*Primary Examiner*—Russell Frejd
(74) *Attorney, Agent, or Firm*—Joseph R. Kelly; Westman, Champlin & Kelly, P.A.

(57) ABSTRACT

The present invention provides an architecture for obtaining an analytical view of data. The invention includes a model service component for receiving an indication of a first object model and generating a dimensional model and a second object model from the first object model. The second object model is analytical in that it preserves relationships identified in the dimensional model, but allows the user to obtain information in terms of objects instead of specifying the data in terms of the dimensional model. The architecture also includes a navigational component that allows a user to navigate from the second object model to underlying data represented by the first object model.

23 Claims, 38 Drawing Sheets

U.S. PATENT DOCUMENTS

| | | | |
|---|---|---|---|
| 2002/0087516 A1 | 7/2002 | Cras et al. | 707/2 |
| 2002/0147848 A1* | 10/2002 | Burgin et al. | 709/246 |
| 2003/0120593 A1 | 6/2003 | Bansal et al. | 705/39 |
| 2003/0187756 A1 | 10/2003 | Klivington et al. | 705/27 |
| 2004/0181502 A1 | 9/2004 | Yeh et al. | 707/1 |
| 2004/0215626 A1 | 10/2004 | Colossi et al. | 707/100 |
| 2005/0038780 A1 | 2/2005 | De Souza et al. | 707/3 |
| 2005/0120021 A1* | 6/2005 | Tang et al. | 707/10 |
| 2005/0246370 A1 | 11/2005 | Rubendall | 707/103 |

OTHER PUBLICATIONS

"Issues of Object-Relational View Design in Data Warehousing Environment", Gopalkrishnan et al., IEEE 0-7803-4778-1/98.

"Automating Data Warehouse Conceptual Schema Design and Evaluation", Phipps et al., DMDW'02, Canada.

"Star/Snow-flak Schema Driven Object-Relational Data Warehouse and Query Processing Strategies", Gopalkrishnan et al., DaWak '99, LNCS, 1999.

Search Report, 2003.

XML.com, "Mapping DTDs to Databases," http://www.xml.com/1pt/a/2001/05/09/dtdtodbs.html, May 19, 2001.

XML.com, "RAX: An XML Database API," http://www.xml.com/1pt/a/2000/04/26/rax/index.html, Apr. 26, 2000.

HiTSoftware, "Unifying XML and Relational Database Application Development," Jan. 2003, pp. 1-10.

Braganholo, et al., "On the Updatability of XML Views Over Relational Databases," International Workshop on the Web and Databases (WebDB), Jun. 12-13, 2003, San Diego, California.

Meng, et al., "OrientStore: A Schema Based Native XML Storage System," 29th VLDB Conference, Berlin, German 2003.

Barrett, Alexandra, "Databases Embrace XML," SW Expert, Aug. 2001, pp. 43-47.

Coox, S.V., "Axiomatization of the Evolution of XML Database Schema," Programming Computer Software, vol. 29, No. 3, 2003, pp. 1-7, Jan. 29, 2003.

Hahsler, Dr. Michael. "Knowledge Management Data Warehouses and Data Mining," Department of Information Processing, Vienna University of Economics and BA, Dec. 11, 2001, pp. 2-29.

"A survey of approaches to automatic schema matching", Rahm et al., The VLDB Journal 10:334-350, Feb. 2001.

* cited by examiner

```
public interface ICodeGenerator
{
        /// <summary>
        /// The method returns a GeneratedCodeWithWritableArePositions.
        /// </summary>
        /// <param name="input">ICodeGenerationInput defines the data needed for cod-
generation.</param>
        /// <returns>The GeneratedCodeWithWritablePositions.</returns>
        GeneratedCodeWithWritableAreaPositions
GeneratedCode(ICodeGenerationInput input);
} public interface IModelBasedCodeGenerator
{
        /// <summary>
        /// The method reads the store and creates the ICodeGenerationInput needed for
code generation.
        /// </summary>
        /// <returns></returns>
        ICodeGenerationInput CreateCodeGenerationInput();

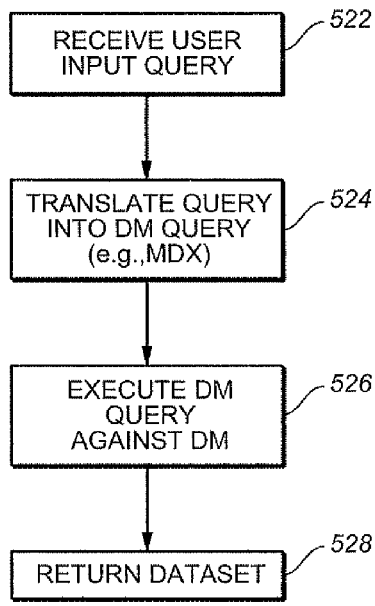

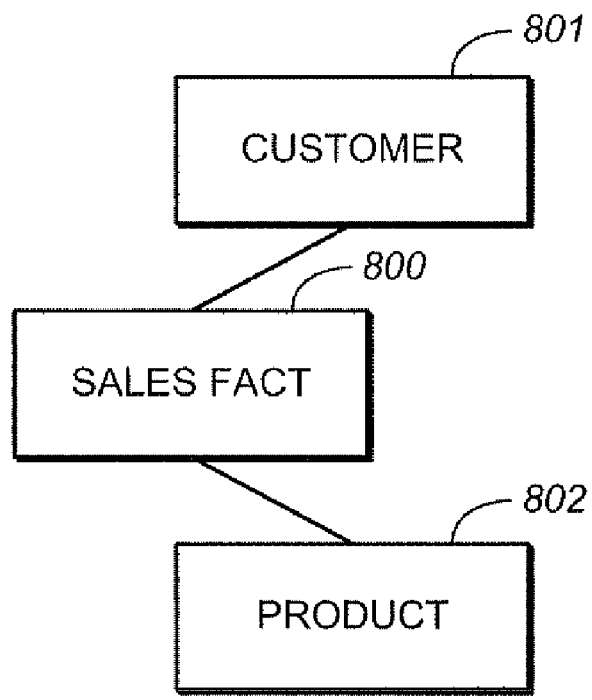
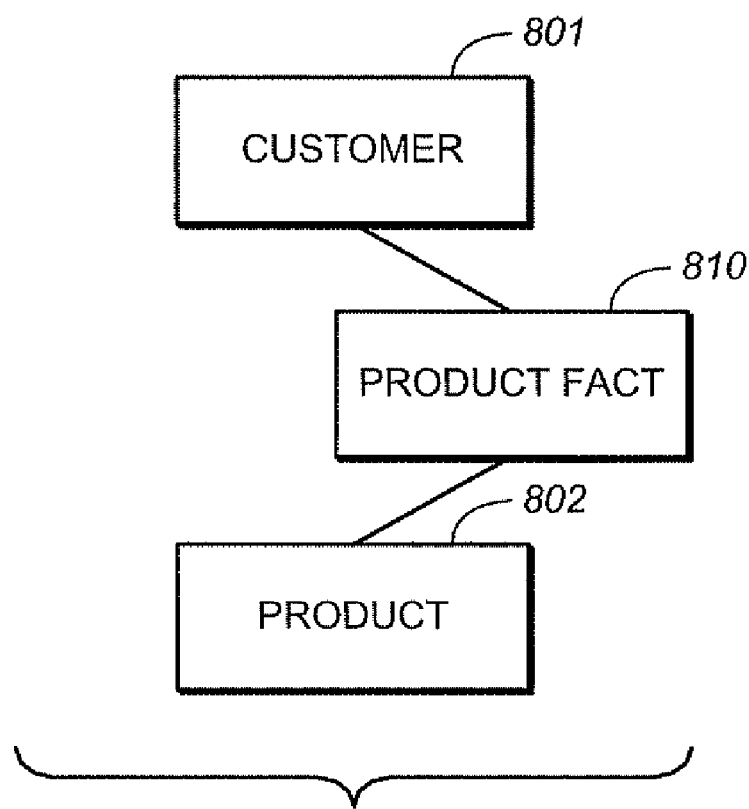
FIG. 24

GET LINKS DATA FLOW

ARCHITECTURE FOR AUTOMATING ANALYTICAL VIEW OF BUSINESS APPLICATIONS

This application is a continuation-in-part of, is co-pending with, and claims priority to, application Ser. No. 10/725,665, filed on Dec. 2, 2003; and in addition this application is a continuation-in-part of, and claims priority to, application Ser. No. 10/727,176, filed Dec. 3, 2003, now U.S. Pat. No. 7,313,561, issued Dec. 25, 2007; and in addition this application is a continuation-in-part of, and claims priority to Ser. No. 10/386,633, filed Mar. 12, 2003, now U.S. Pat. No. 7,275,024, issued Sep. 25, 2007.

BACKGROUND OF THE INVENTION

The present invention deals with accessing saved data. More specifically, the present invention deals with an overall architecture for logically extending to the conventional transaction based application framework an Analytical View (AV) of business data and its supporting subsystems. The AV is based on a design time service referred to as model service, a programming model referred to as Business Intelligence Entities (BIEs) and a runtime service to provide a metadata driven information navigation functionality. The AV feature set addresses enterprise application requirements for analysis and decision support, and complements the transactional feature set currently provided by a conventional application framework.

Prior business database accessing systems focused primarily on the transactional portion of the data accessing system. In other words, transactional data (in non-aggregated form) was generated and saved to the database for later retrieval, reporting and viewing. In such systems, it was very difficult, to retrieve the data in such a way that a user could obtain an analytical view of the data. There were a variety of reasons that this type of viewing of the data was very difficult, and those are addressed below.

When designing software applications involving business transactions, application developers conventionally use a model driven architecture and focus on domain specific knowledge. The model driven architecture often includes business objects (or business entities) involved in the business transactions, such as business entities corresponding to customers, orders and products. These entities are modeled as objects following the paradigm of object orientation.

Each object encapsulates data and behavior of the business entity. For example, a Customer object contains data such as name, address and other personal information for a customer. The Customer object also contains programming code, for example, to create a new Customer, modify the data of an existing Customer and save the Customer to a database.

The object model also enables a description of relationships among the business entities modeled. For example, a number of Order objects can be associated with a Customer object representing the customer who makes those orders. This is known as an association relationship. Other types of relationships can also be described, such as compositions. An Order, for example, can be "composed of" a collection of OrderLines. These OrderLines do not exist independently of the Order they belong to. In this way, application developers convert the business logic associated with their applications to a set of models. Applications are built that implement this business logic, often using on-line transaction processing (OLTP).

Objects in an object model typically store their data in a relational database. To satisfy traditional reporting requirements, data is retrieved through the relational database using extraction, transformation and loading (ETL) processes. Data is retrieved, using these processes, into a staging area known as a data mart.

Currently, there is a knowledge gap between users who work on data marts and those who perform OLTP application development. Those who work on data marts do not normally have knowledge about how the object model is constructed. Therefore, when the data is retrieved through the ETL processes, the business logic (such as the relationships and classes, etc.) that was built into the object model is lost.

Traditionally, therefore, in order to facilitate user's reporting requirements, another model known as a dimensional model is built from the data in the data mart. The dimensional model includes a Fact table, that has measures, and associated tables, that are referred to as dimensions. Once the dimensional model is built, a user can specify a query against the dimensional model to obtain data in a somewhat logical fashion, even through the business logic built into the object model was lost.

This type of system, however, requires that a great deal of time be spent in reconstructing the business logic (or at least part of the business logic) to obtain the dimensional model. This can require companies that use such systems to maintain two groups of programmers, one to develop the business logic and implement it in an object model, and another to support the reporting structure required by the company. Of course, this duplication of personnel is both costly and inefficient.

SUMMARY OF THE INVENTION

The present invention provides an architecture for obtaining an analytical view of data. The invention includes a model service component for receiving an indication of a first object model and generating a dimensional model and a second object model from the first object model. The second object model is analytical in that it preserves relationships identified in the dimensional model, but allows the user to obtain information in terms of objects instead of specifying the data in terms of the dimensional model. The architecture also includes a navigational component that allows a user to navigate from the second object model to underlying data represented by the first object model.

BRIEF DESCRIPTION OF THE DRAWINGS

FIG. 13 illustrates one exemplary interface for invoking the functionality of the business intelligence entity generator.

FIG. 14 is a flow diagram illustrating how data is retrieved from a business entity in accordance with one embodiment of the present invention.

FIGS. 19-23 are screen shots demonstrating presentations of data in the context of a business application.

FIG. 24 is a diagrammatic representation of a star-oriented data organization schema.

Appendix A is an example of an XML focal point specification file.

Appendix B is an example of a mapping file.

Appendix C is an example of pseudo code illustrating the operation of the model services system.

Appendix D illustrates the interfaces supported by components of the model services system and the business intelligence entity generator.

DETAILED DESCRIPTION OF ILLUSTRATIVE EMBODIMENTS

Various aspects of the present invention deal with an architecture that allows a user to obtain an analytical view of data. However, prior to describing the present invention in greater detail, one illustrative environment in which the present invention can be used will be described.

Figure 1:
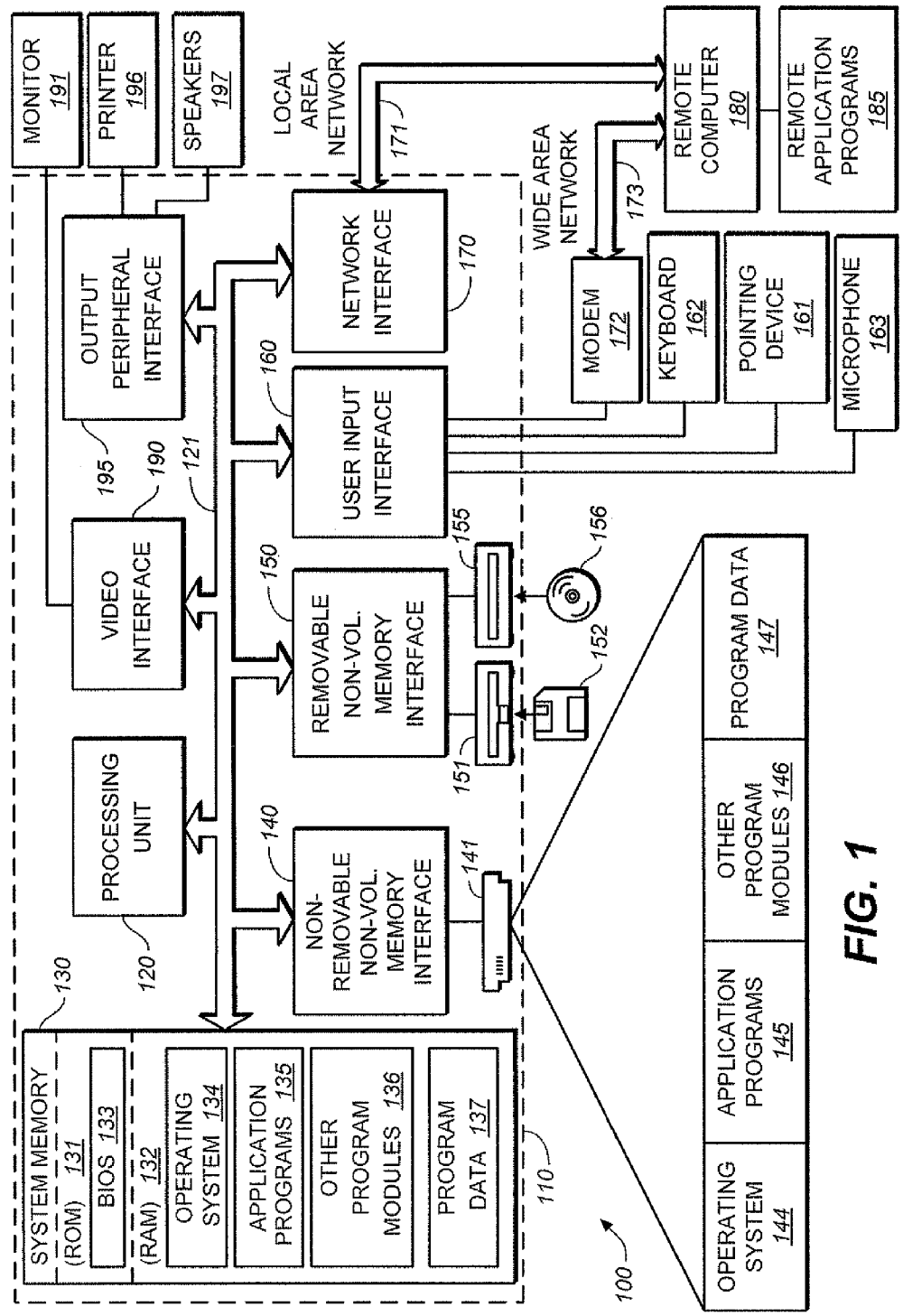
FIG. 1 is one exemplary embodiment of an environment in which the present invention can be used.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
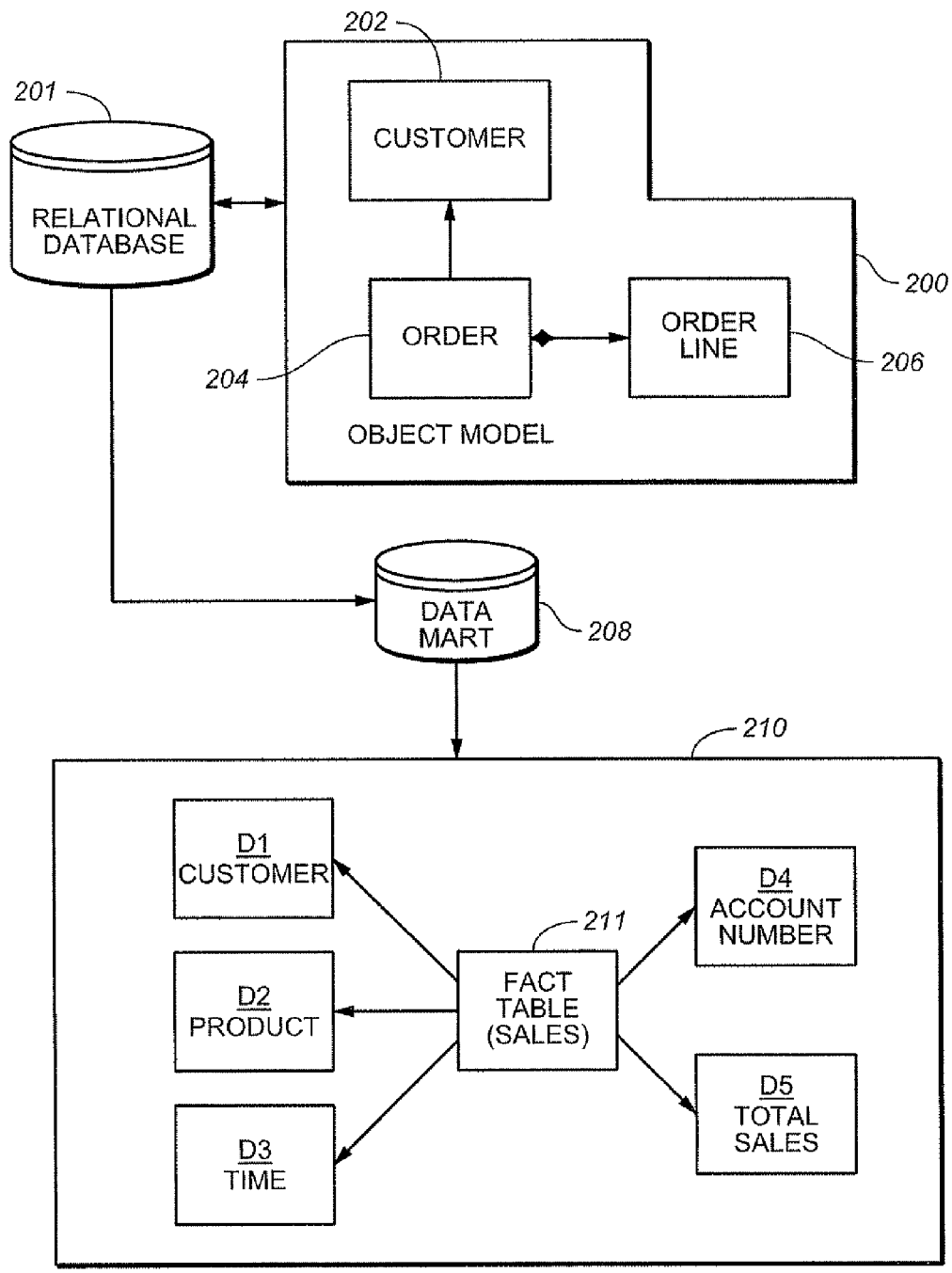
FIG. 2 illustrates a prior art system for implementing business logic and a reporting structure.

FIG. 2 is a block diagram illustrating data processing in accordance with the prior art. FIG. 2 illustrates that an application developer has implemented business logic used by an application by developing object model 200. As shown in FIG. 2, object model 200 includes a plurality of different business entities, including a Customer entity 202, an Order entity 204 and an OrderLine entity 206. The object model 200 uses notation which is commonly known as unified modeling language (UML). The notation shows a composition relationship between Order 204 and OrderLine 206. Thus, it indicates that the Order entity 204 is composed of one or more OrderLine entities 206. Object model 200 also shows that Order 204 has an association with Customer 200.

In prior systems, in order to support a desired reporting structure, data was first retrieved from a persistent data store (such as a relational database) 201 using extraction, transformation, and loading (ETL) processes and placed in a data mart 208 which acted as a staging area for the data prior to retrieving it.

Then, developers supporting the reporting structure for the user generated a dimensional model, such as model 210. The dimensional model typically includes a Fact table 211 which has measures noted therein. The Fact table 211 also has a plurality of dimensions illustrated as D1-D5 in FIG. 2. The dimensional model 210 was typically created based on the particular features in the data that the user desired to report on and analyze. Thus, some of the business logic implemented in object model 200 was recreated in dimensional model 210.

However, typically, the application developers that implement business logic through object models are different, and have a different knowledge base, than those who develop dimensional models. Therefore, a great deal of time and effort has traditionally been spent in reconstructing at least a part of the business logic implemented through object model 200 in obtaining a dimensional model 210 which can be used for reporting.

Another difficulty associated with some prior art techniques is that even to generate reports from dimensional model 210 required the report generator to be familiar with multi-dimensional expressions (MDX). MDX can be difficult to learn because it has a complex syntax, and it is different than the object oriented expressions required to create and interact with object model 200. Therefore, even after dimensional model 210 was constructed, generating reports has still required personnel with specialized knowledge, other than that used in object oriented programming.

Figure 3:
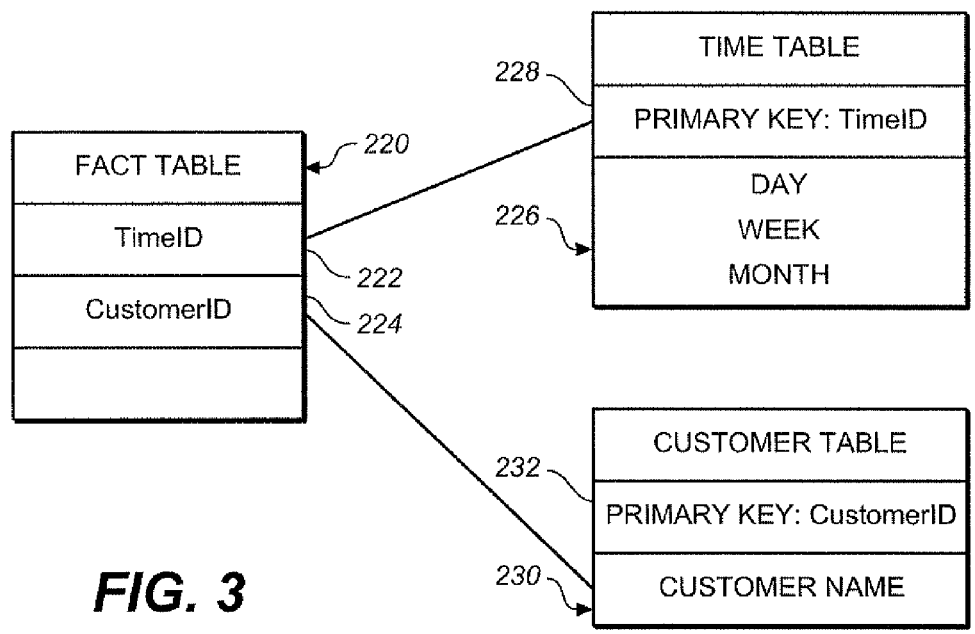
FIG. 3 is an example of a dimensional model illustrating a foreign key relationship.

Prior to describing the invention in greater detail, the concept of foreign key relationships will be discussed. FIG. 3 is a simplified diagram illustrating the concept of a foreign key relationship. FIG. 3 shows that a Fact table 220 includes other tables associated with "time" and "customer" as dimensions. Therefore, Fact table 220 includes a TimeID field 222 and a CustomerID field 224.

The Time table 226 includes a primary key referred to as TimeID in field 228. The primary key uniquely identifies a record in the Time table 226. Time table 226 also contains a number of additional fields related to time, such as day, week and month.

Customer table 230 also includes a primary key field that contains a primary key referred to as CustomerID 232. The primary key of the Customer table uniquely identifies a record in the Customer table. Of course, the Customer table also includes additional items associated with the customer, such as customer name.

Therefore, the primary key in a table is a unique identifier for the records in that table. However, the TimeID field 222 and CustomerID field 224 in Fact table 220 are identifiers which refer to other tables (in this case 226 and 230, respectively). Therefore, the keys contained in fields 222 and 224 in Fact table 220 are foreign keys. Some complexity arises with respect to foreign key relationships. For example, a table cannot be deleted if its primary key is a foreign key in another table, without dealing with the foreign key relationship. Otherwise, such a deletion breaks the integrity constraints typically imposed on such systems.

Figure 4:
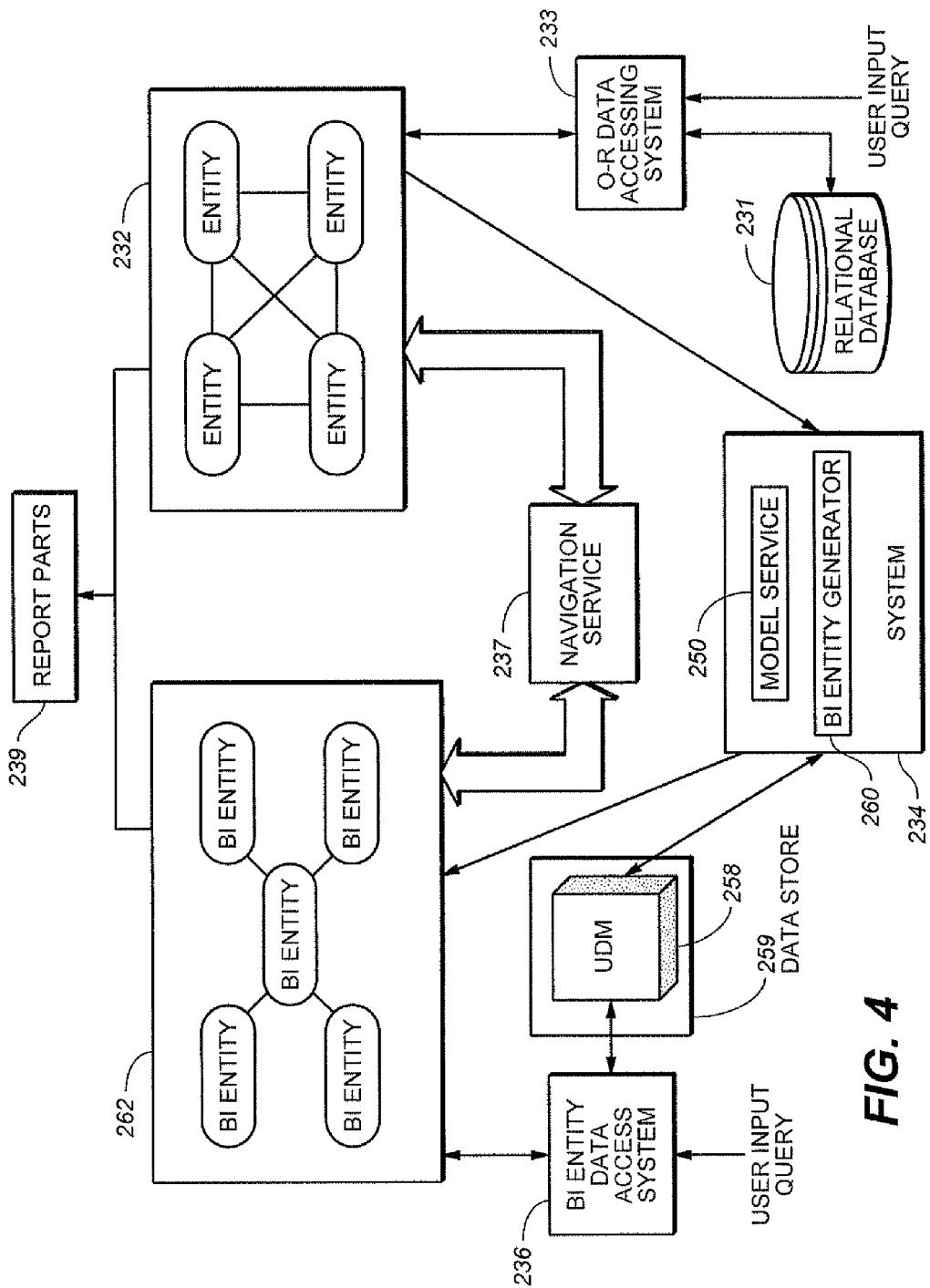
FIG. 4 is a block diagram of an architecture in accordance with one embodiment of the present invention.

FIG. 4 is a block diagram of an analytical data accessing architecture in accordance with one embodiment of the present invention. Business data is stored in relational database 231. That data is illustratively stored in tables, but is represented by objects or entities 232. The entities 232, represent such things as customer, order and order line, as is discussed in greater detail below.

In one illustrative embodiment, the data can be queried in terms of entities 232 through object-relational data accessing system 233. A user-input query is provided in terms of the entities 232, or attributes of those entities, and the entity query is translated into a relational database statement executed against relational database 231. Data accessing system 233 then formats the data, as a desired result set, and provides it to the user.

However, because entities 232 are often arranged in terms of transactional processing, it can be difficult, even with the flexibility provided by data accessing system 233, to obtain an analytical view of the business data stored in relational database 231. Therefore, in accordance with one embodiment of the invention, model service/BI generator system 234 is provided. System 234 illustratively includes model service component 250 and entity generator component 260.

As discussed in greater detail later in the specification, system 234 automatically generates a dimensional model, such as UDM cube 258, and stores it in data store 259 (which can be implemented in the same store as database 231). System 234 also illustratively automatically generates business intelligence entities (BI entities) 262 from UDM cube 258 and the information represented by entities 232. In addition, BI entity data accessing system 236 allows a user to query the data represented by BI entities 262 in terms of objects. System 236 accesses UDM cube 258 to obtain the data represented by BI entities 262 and presents that data to the user in terms of the BI entities referenced in the query. Since the BI entities are generated at least based in part on the dimensions of dimensional model 258, they can represent an analytical, aggregated, view of the data.

Navigation service 237 allows a user to navigate from data represented by BI entities 262, back to the original entities 232 that contain the data. For instance, a user viewing data represented by BI entities 262 can "drill down" to the original transactional data that gave rise to the data in BI entities 262. This navigation is provided through navigation service 237.

FIG. 4 also shows that data can be reported through an abstraction layer referred to herein as report parts 239. Report parts 239 are contained in reports generated from the architecture and are described in greater detail below with respect to FIG. 4D.

Figure 4A:
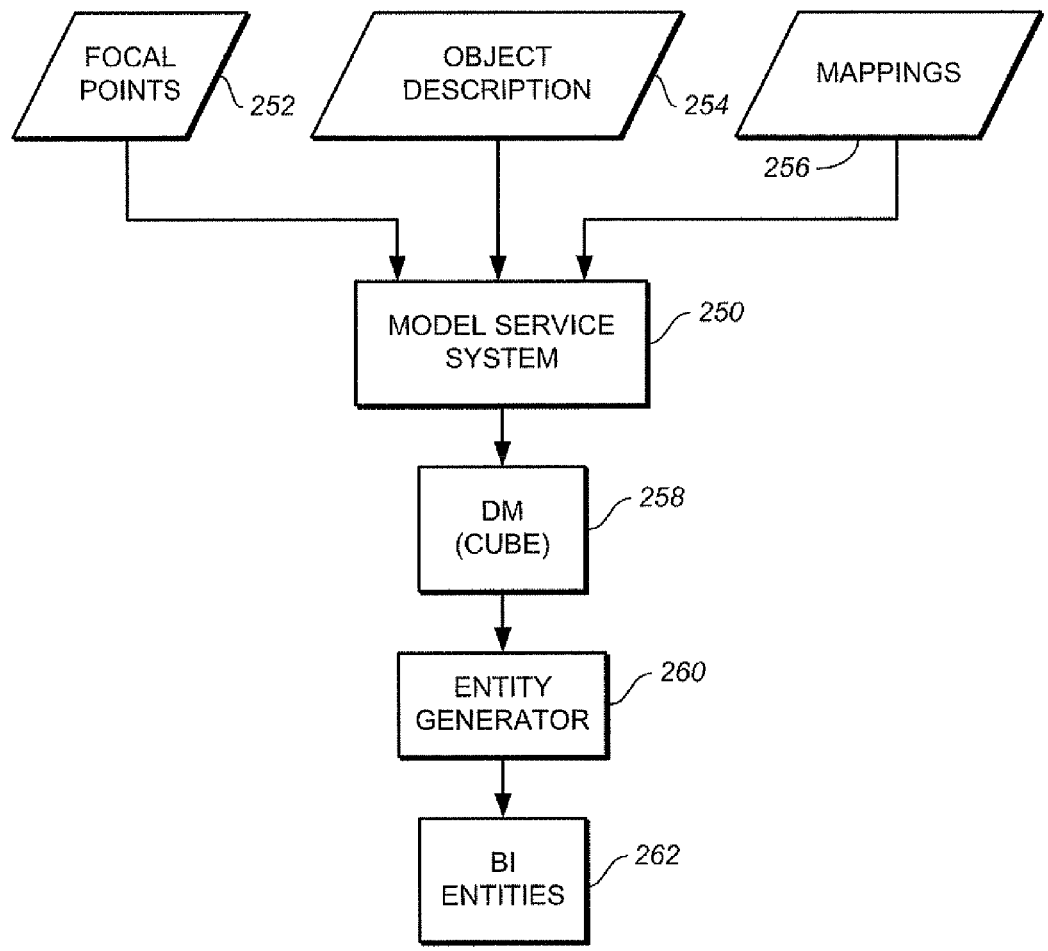
FIG. 4A is a block diagram of one embodiment of the present invention.

FIG. 4A illustrates one embodiment of model services system (or component) 250 that takes, as inputs, a specification of focal points 252, an object description 254 and a set of persistent data store mappings 256. System 250 then produces a dimensional model 258 based on the inputs. FIG. 4A also illustrates entity generator component 260 that generates a set of objects (or entities), referred to herein as business intelligence entities (or BI entities) 262, based on the dimensional model 258.

Focal points 252 represent certain data in the object model that is marked by the user as being a focal point of analysis. Focal points 252 can illustratively be specified in an XML specification file. One example of an XML specification file is shown in Appendix A hereto.

Figure 4B:
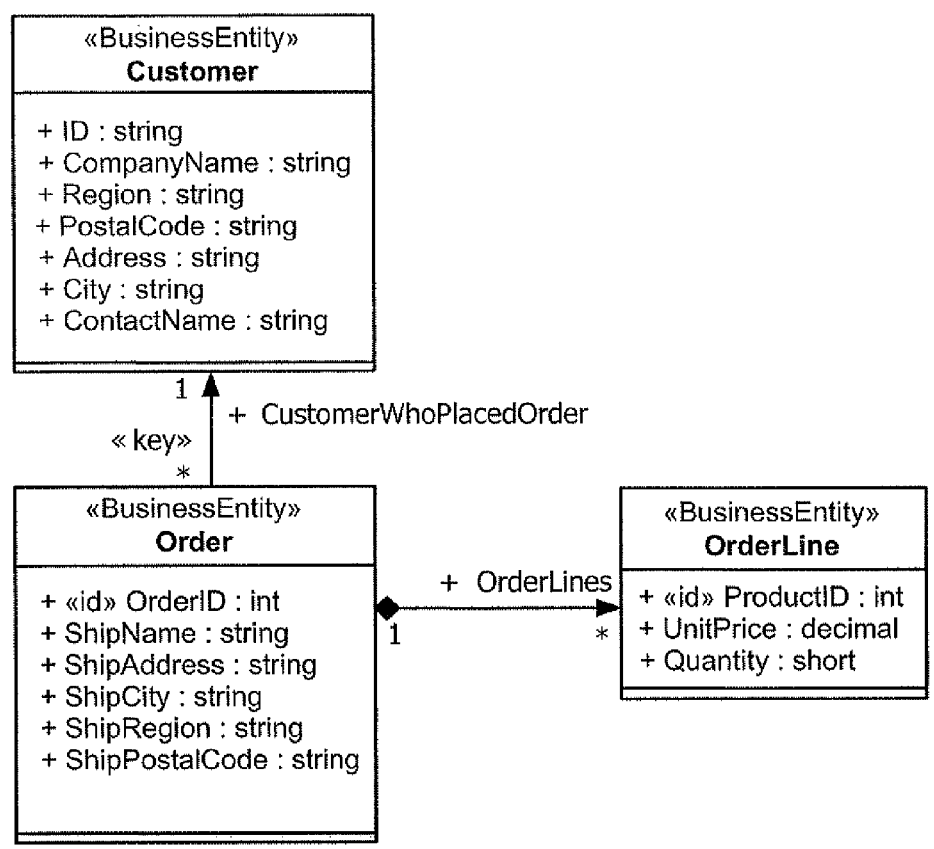
FIG. 4B is an example of an object model description in the form of a UML class diagram in accordance with one embodiment of the present invention.

Object description 254 is an input which describes the object orientation relationships in a set of metadata corresponding to a set of objects (such as business entities 232). This can take the form of, for example, a UML class diagram. One example of a UML class diagram for a plurality of business entities (Customer, Order and OrderLine) is illustrated in FIG. 4B.

Persistent data store mappings 256 map the data referred to by the object model to the persistent data store, in one illustrative embodiment the relational database 231 shown in FIG. 4. These are illustratively created by the user in the form of a map file, an example of which is found in Appendix B. The map file shown in Appendix B maps from a Customer entity to relational database tables.

Model services system 250 receives inputs 252, 254 and 256 and automatically generates a dimensional model 258 based on those inputs. In accordance with one embodiment of the present invention, dimensional model 258 is inferred from the inputs supplied by the user, and there is no requirement for a second set of developers to be involved in recreating the business logic to obtain model 258. In one embodiment, and as will be discussed in greater detail below, model services system 250 uses the associations and compositions in the object model specified by the object model description 254 to infer foreign key relationships in dimensional model 258. System 250 also uses the focal points of analysis defined by the user in file 252 and the persistent data store mappings 256 to automatically create dimensional model 258 and access data through model 258.

However, even a system which automatically generates dimensional model 258 can be improved. For example, obtaining information through dimensional model 258 still requires the user to know MDX or some sort of dimensional model querying language. Therefore, in accordance with another embodiment of the present invention, entity generator 260 is provided. Entity generator 260 creates business intelligence entities 262 in the form of objects, from the cubes and dimensions in dimensional model 258. This is also described in greater detail below.

Figure 4C:
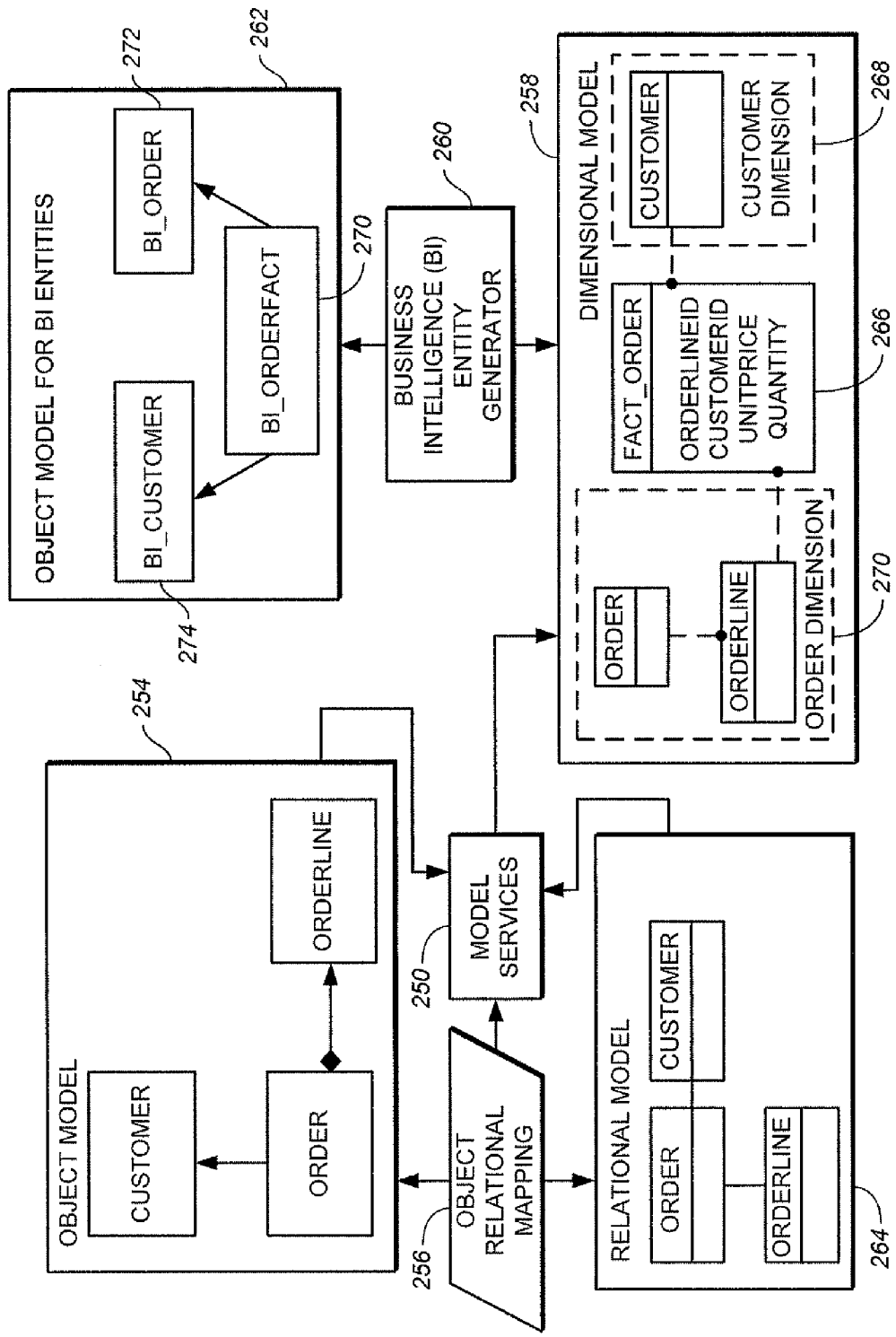
FIG. 4C is a more detailed block diagram of the system shown in FIG. 4A.

FIG. 4C illustrates the system shown in FIG. 4A, in greater detail. In the example illustrated in FIG. 4C, the object model is represented by object description 254, and the mappings 256 are shown between the object model representation 254 and the relational database representation 264 which represents relational database 231. FIG. 4C also shows dimensional model 258 in greater detail. Dimensional model 258 includes a Fact table 266 along with a plurality of dimensions 268 and 270 (the Customer dimension and the Order dimension). Each of the dimensions is formed of one or more tables. It is also worth noting that Fact table 266 includes the OrderlineID and CustomerID as foreign key references.

FIG. 4C also illustrates one embodiment of a set of BI entities 262. In the example shown in FIG. 4C, the BI entities 262 include a BIOrderFact entity 270, a BIOrder entity 272 and a BICustomer entity 274. Entities 272 and 274 are related to entity 270.

By looking at the entities and their relationships in object model description 254, it can be seen that the dimensional model will require a snowflake-schema, such as that shown in dimensional model representation 258. It can thus be inferred that two dimensions will be created, Order and Customer. The Order dimension will have two levels, Order and OrderLine. The measures (or numeric values) in the Fact table 266 will include UnitPrice and Quantity and will come from the OrderLine entities.

Figure 4D:
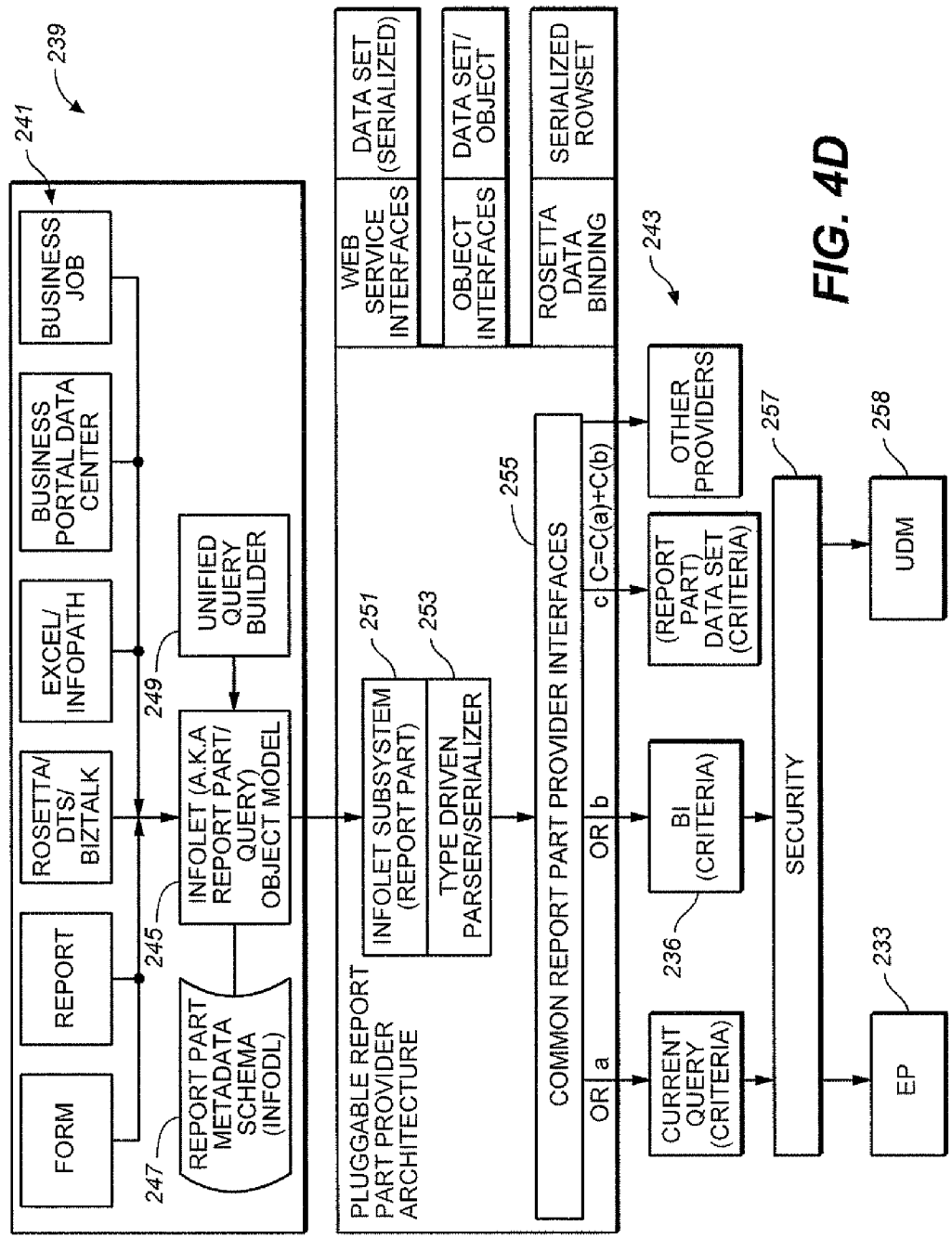
FIG. 4D is a more detailed block diagram of the report parts architecture shown in FIG. 4.

FIG. 4D is a more detailed block diagram of the architecture associated with report parts 239 shown in FIG. 4. Reports generated from the information shown in FIG. 4 contain report parts for data access. A number of different report parts are shown at 241 in FIG. 4D. Report parts 241 represent a higher level of data abstraction for data coming from entities 232, BI entities 262, object spaces, XML, etc. The report parts architecture 239 provides reusability for reports containing report parts 241, and at the same time provides a pluggable architecture for adding object oriented query providers such as those illustrated at 243 in FIG. 4D. In addition, this level of data abstraction allows the architecture to provide a unified query experience in design time, and a consistent data access interface in run time.

In one illustrative embodiment, the different query expressions used by different query provides 243 are not unified. Instead, during design time, "type" information is gathered from selected objects and used to prepare the expressions for queries. This design time metadata is gathered by object model 245 and is persisted in a global metadata store (or in metadata store 247). The metadata is gathered by unified query builder 249.

During run time, the design time metadata for a query is received by subsystem 251 and is serialized by serializer 253. Based on its type information, the query is provided to a designated query provider 243 through a common provider interface 255. The query providers 243 can access the information, in one embodiment, through a suitable security layer 257. If the received query requires access to two different query providers 243, it can be virtualized in a dataset first.

FIG. 4D also shows that the layer containing subsystem 251, type driver parser/serializer 253 and common provider interface 255 can also be accessed through a web service interface, an object interface, or a data binding service by a serialized dataset, a dataset for objects and a serialized row set, respectively.

Figure 5:
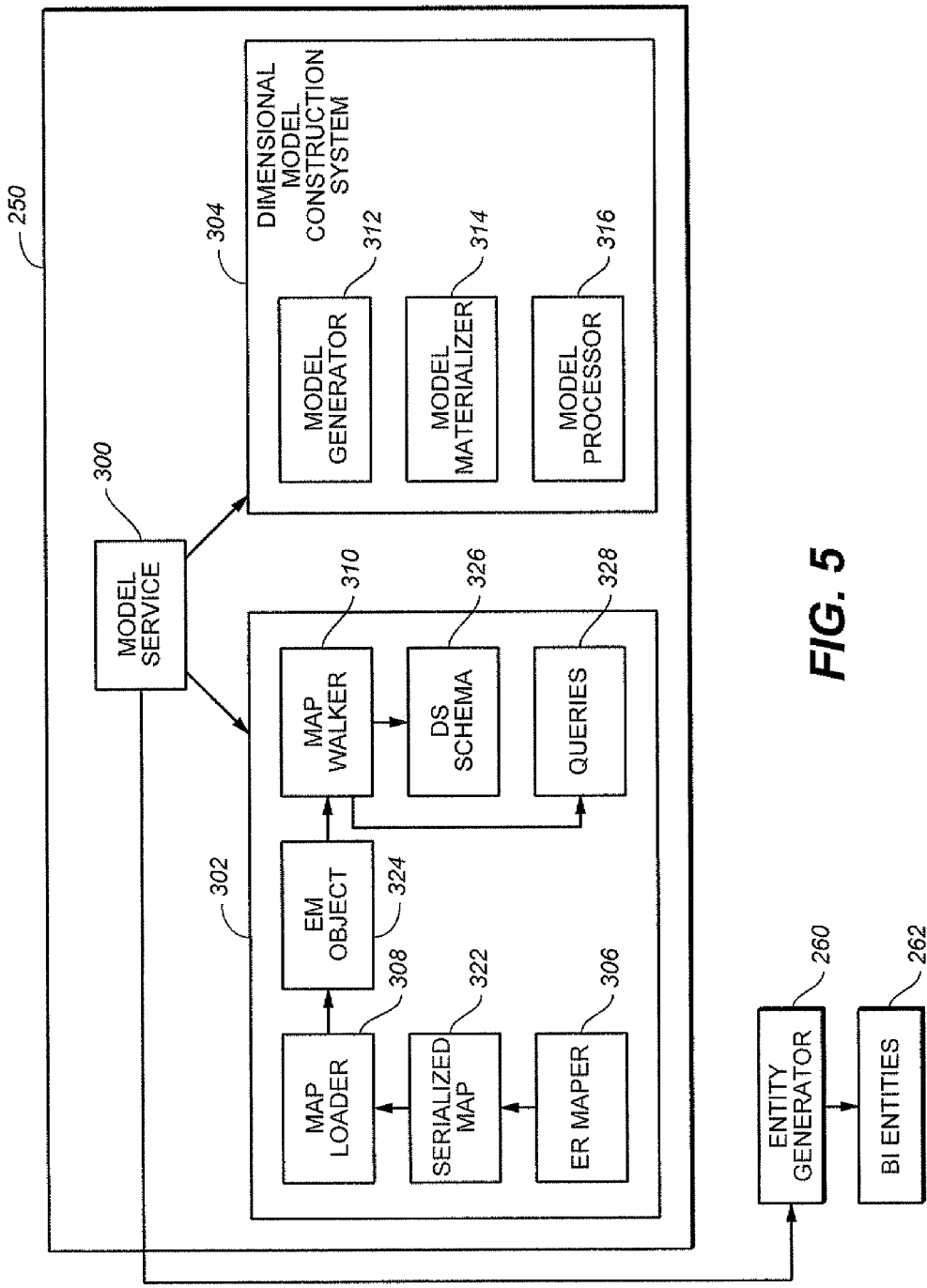
FIG. 5 is a more detailed block diagram of a model services component in accordance with one embodiment of the present invention.
Figure 6A:
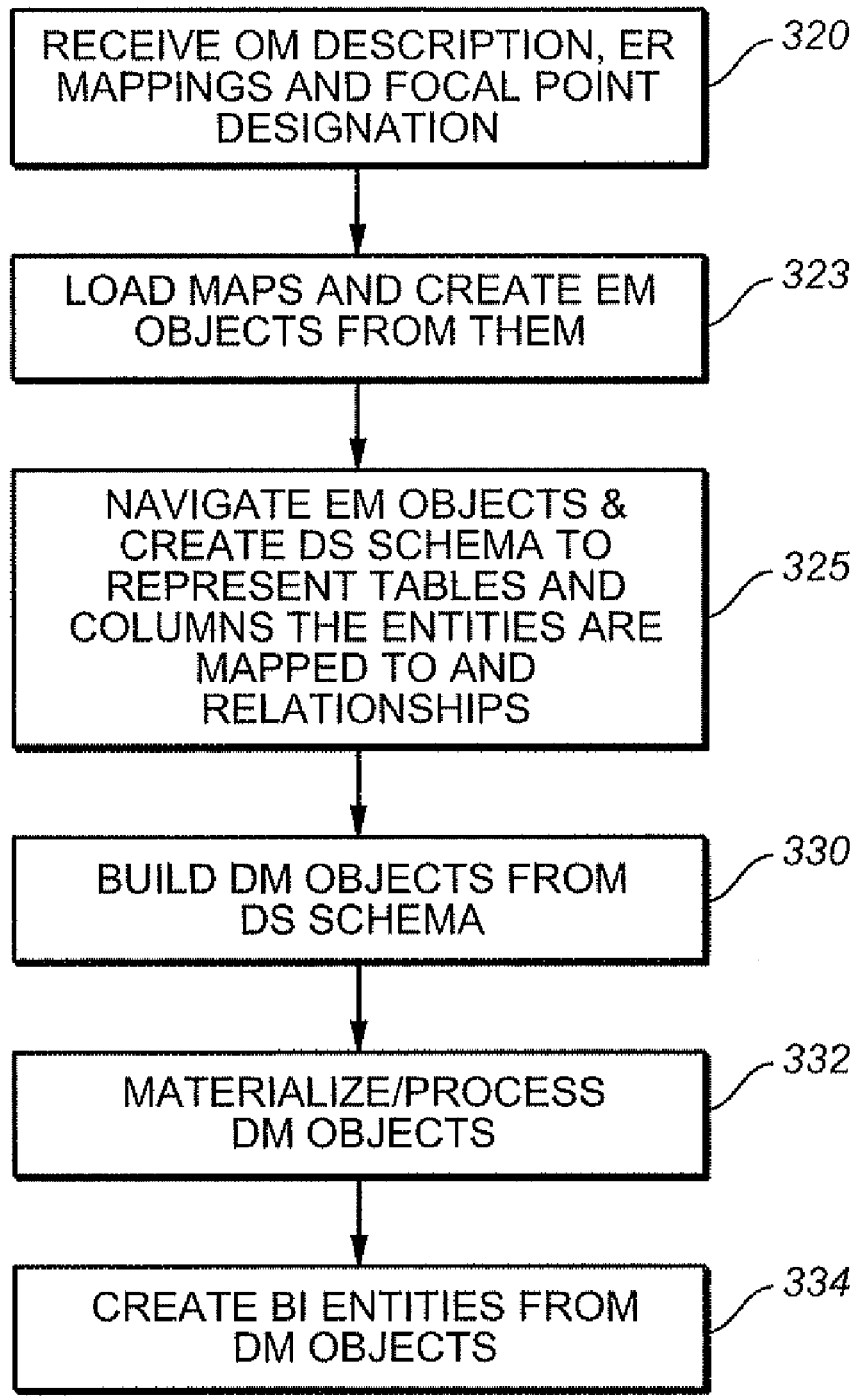
FIG. 6A is a flow diagram better illustrating the operation of the model services component shown in FIG. 5.

FIG. 5 is a more detailed block diagram of model services system 250. FIG. 6A is a flow diagram better illustrating the operation of system 250 shown in FIG. 5. FIGS. 5 and 6A will be described in conjunction with one another. FIG. 5 shows that model services system 250 includes a model service component 300, a map system 302 and a dimensional model construction system 304. Map system 302, in turn, includes entity relation (ER) mapper 306, map loader 308, and map walker 310. Dimensional model construction system 304 includes model generator 312, model materializer 314 and model processor 316. FIG. 5 also illustrates entity generator 260 and BI entities 262.

Model services component 300 provides a main user interface to accept focal point specification 252, object description 254 and ER mappings 256. Model services component 300 can also invoke the functionality associated with map system 302, dimensional model construction system 304 and entity generator 260. Thus, as a first step in the conversion process, model services system 250 receives, through the top level interface implemented by component 300, focal point specification 252, object description 254 and persistent data storage mappings 256. This is indicated by block 320 in FIG. 6A.

Figure 6B:
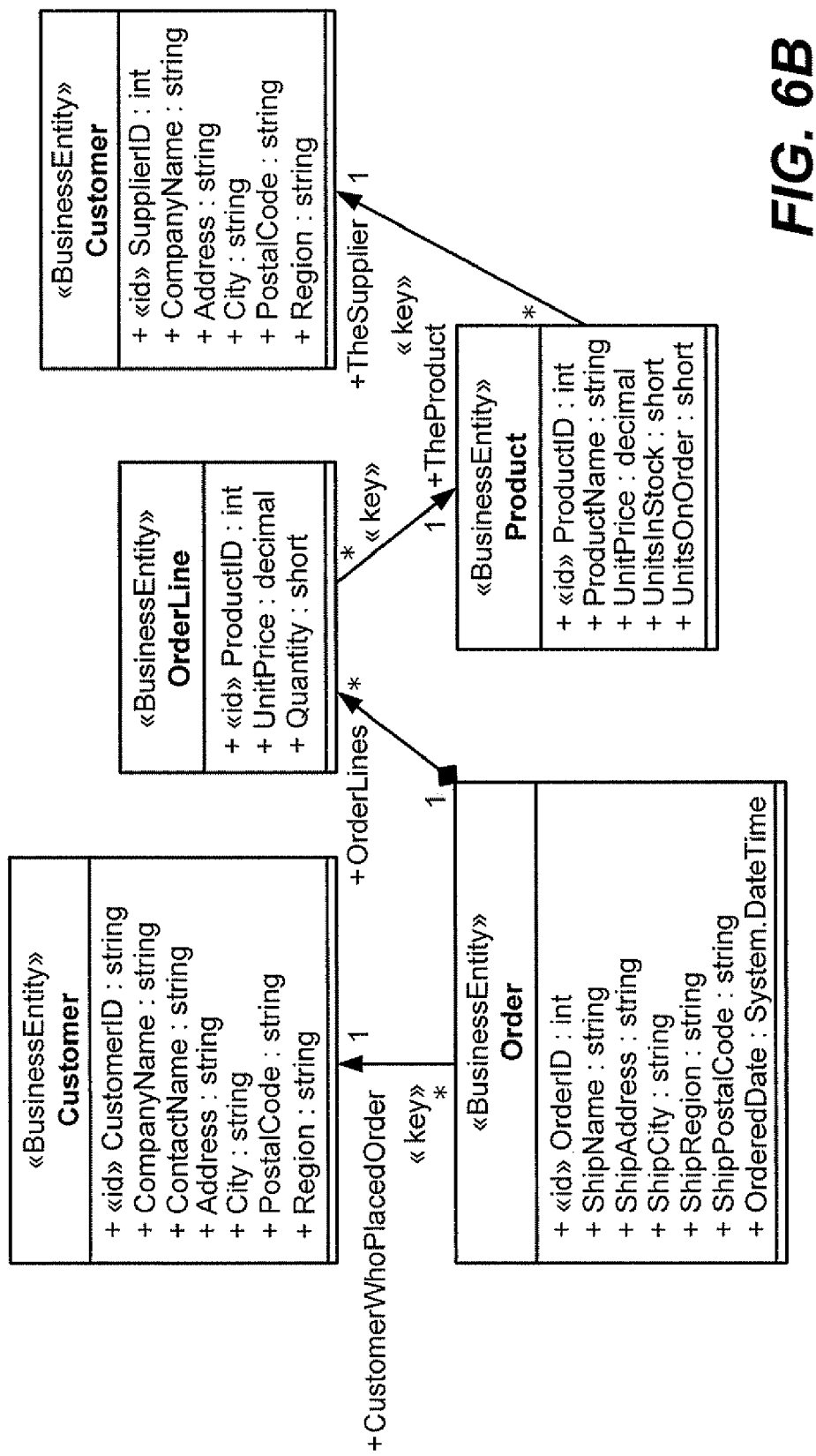
FIG. 6B is a more complex example of an object model description in the form of a UML class diagram.

For the sake of the present example, a more detailed object description than that shown in FIG. 4B is warranted. Therefore, assume for the sake of the present description that model services system 250 receives, as the object description, the UML class diagram shown in FIG. 6B. It is similar to that shown in FIG. 4B, except that it is slightly more complex and includes a bit more detail.

Model services component 300 provides these inputs to map system 302 and invokes certain functionality in map system 302. Using the ER mapper, the user produces serialized ER maps 256 to describe how the object model is mapped to the relational database. These serialized maps 322 are then loaded by map loader 308. Map loader 308 deserializes those maps and converts them to entity map (EM) objects 324. The precise form of EM objects 324 is not important. They are simply objects generated from the serialized maps 322 that are predefined such that the structure of EM objects 324 is known by map walker 310. Loading maps 322 and creating EM objects 324 is indicated by block 323 in FIG. 6A.

Map walker 310 navigates EM objects 324 and generates a data set schema to represent tables and columns that the entities are mapped to in the relational database, and to represent the relationship among them. Navigating the EM objects to create data set schema 326 is indicated by block 325 in FIG. 6A. The data set schema 326 generated by map walker 340 forms the basis for constructing a dimensional model cube in the dimensional model. Map walker 310 can also fill in any additional information in the data set schema 326 required by the dimensional model. In addition, map walker 310 generates queries 328 to tables in the relational database that will be used to define Fact tables in the dimensional models. Schema 326 is then provided to dimensional model construction system 304. In particular, model generator 312 builds dimensional model cubes based on schema 326. Building the dimensional model cubes from data set schema 326 is illustrated by block 330 in FIG. 6A and is described in greater detail below with respect to FIG. 7.

Model materializer 314 provides an interface to materialize the dimensional models generated by model generator 312. Materializing the dimensional models is indicated by block 332 in FIG. 6A. Model processor 316 provides an interface to process the models materialized by model materializer 314. It should be noted that, at this point, the dimensional model can be queried using MDX or any other language used to query a multi-dimensional model. However, in accordance with a further embodiment of the present invention, entity generator 260 is invoked by system 250 to generate BI entities 262 from the dimensional model created. Creating BI entities from the dimensional model objects is illustrated by block 334 in FIG. 6A and is described in greater detail below with respect to FIGS. 10A-10B.

Figure 7:
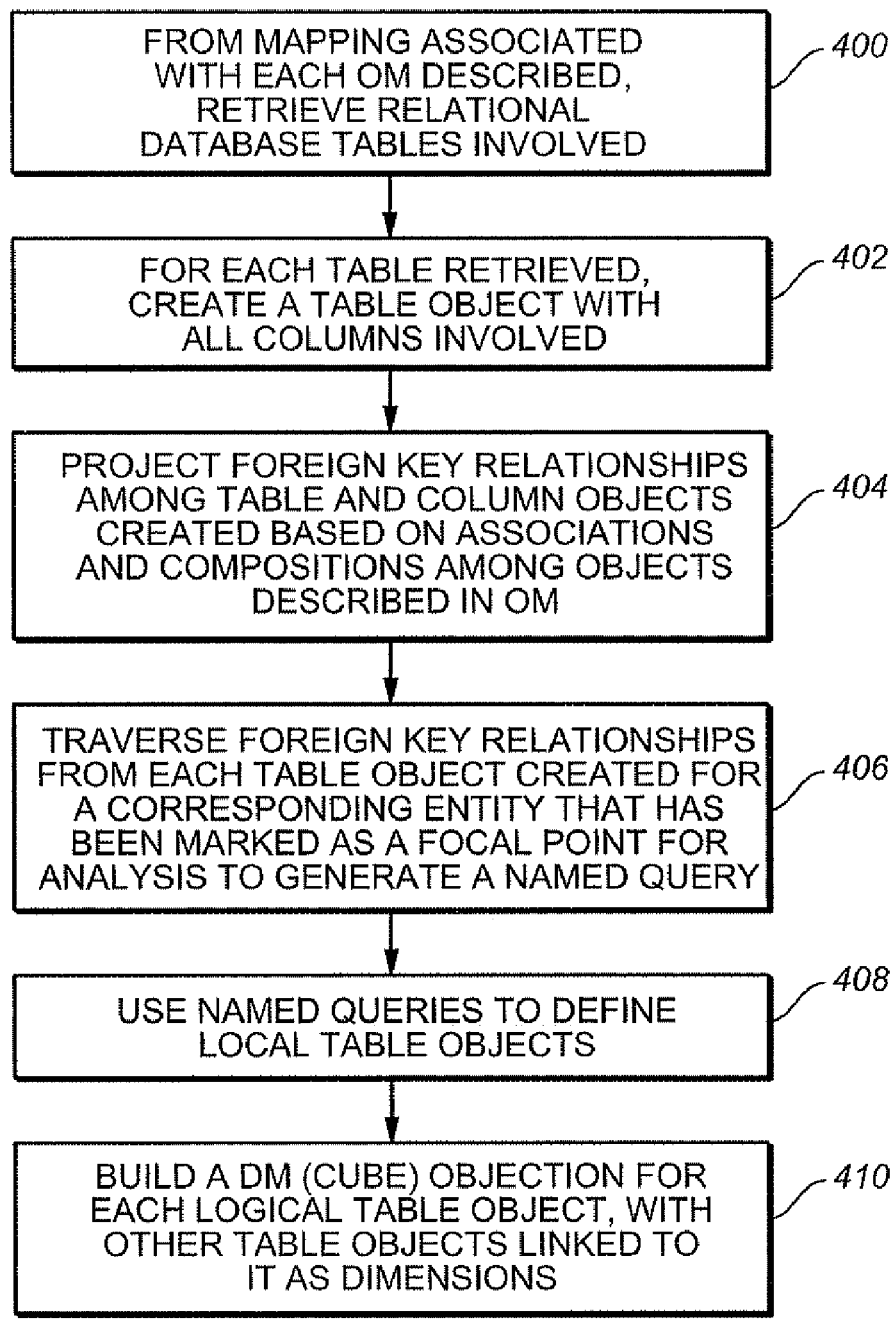
FIG. 7 is a flow diagram illustrating the creation of a dimensional model in accordance with one embodiment of the present invention.

FIG. 7 is a flow diagram better illustrating the creation of a dimensional model from an object model using the map walker 310 and dimensional model construction system 304 shown in FIG. 5. From the ER mappings associated with each entity in the object model described, the relational database tables involved with those entities are retrieved. This is indicated by block 400 in FIG. 7. For each table retrieved, a table object is created. The table object has fields which include all of the columns associated with the table. This is indicated by block 402 in FIG. 7.

Foreign key relationships among the table and column objects created are projected based on the associations and compositions among objects described in the object model description (such as the UML class diagram) being processed. The map walker 310 then traverses foreign key relationships from each table object created, for a corresponding entity that has been marked as a focal point for analysis. Recall that the focal points are specified by a focal point specification file which has also been input by the user. The foreign key relationships are traversed in a many-to-one direction toward table objects whose corresponding entity has been marked as a focal point for analysis, in order to generate a named query. The named query can be synthesized by combining the identified tables using an appropriate persistent data store query statement (such as a structured query language (SQL) statement). Thus, the named query is designed to reach out to other dimensions associated with each table object, based on focal points specified by the user.

Figure 8:
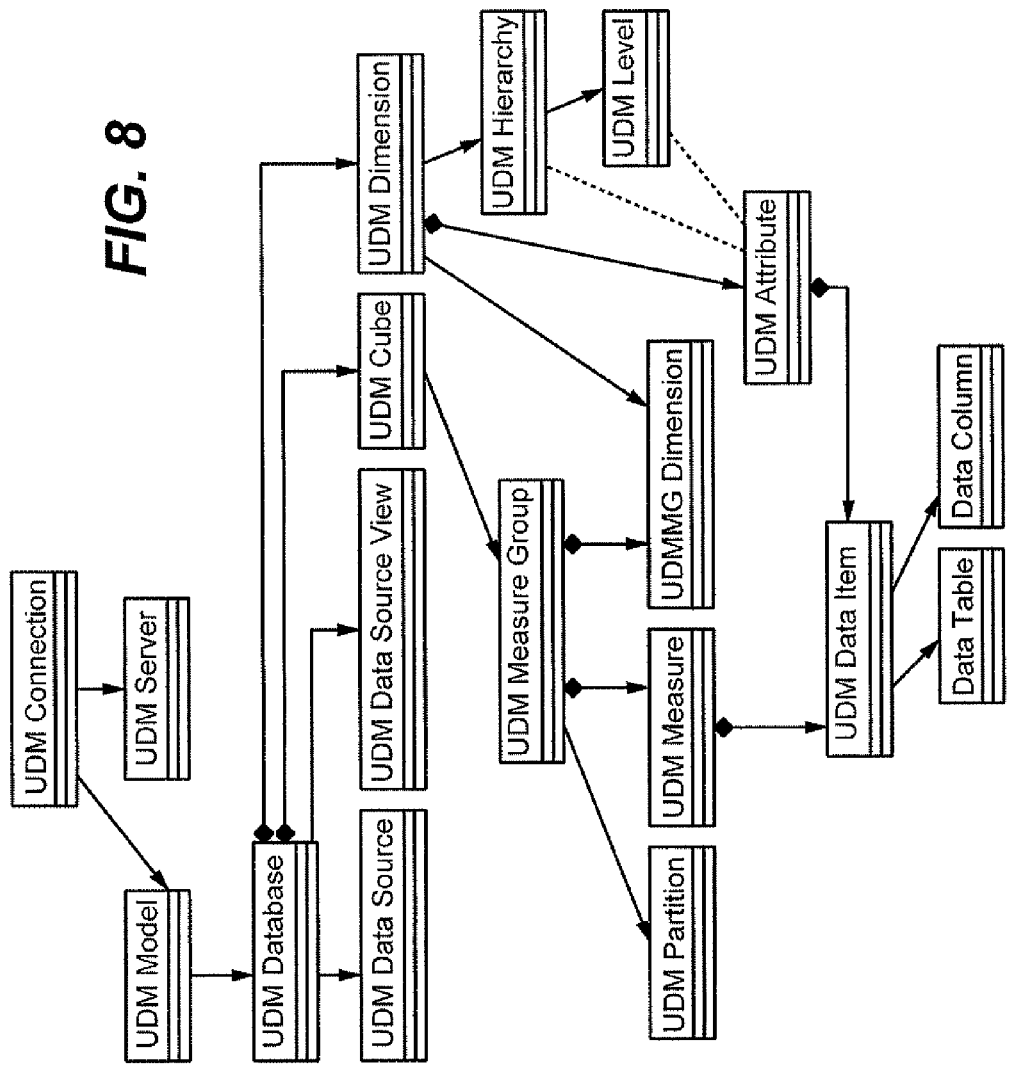
FIG. 8 is one embodiment of a class diagram for a generalized form of a multi-dimensional model.
Figure 9:
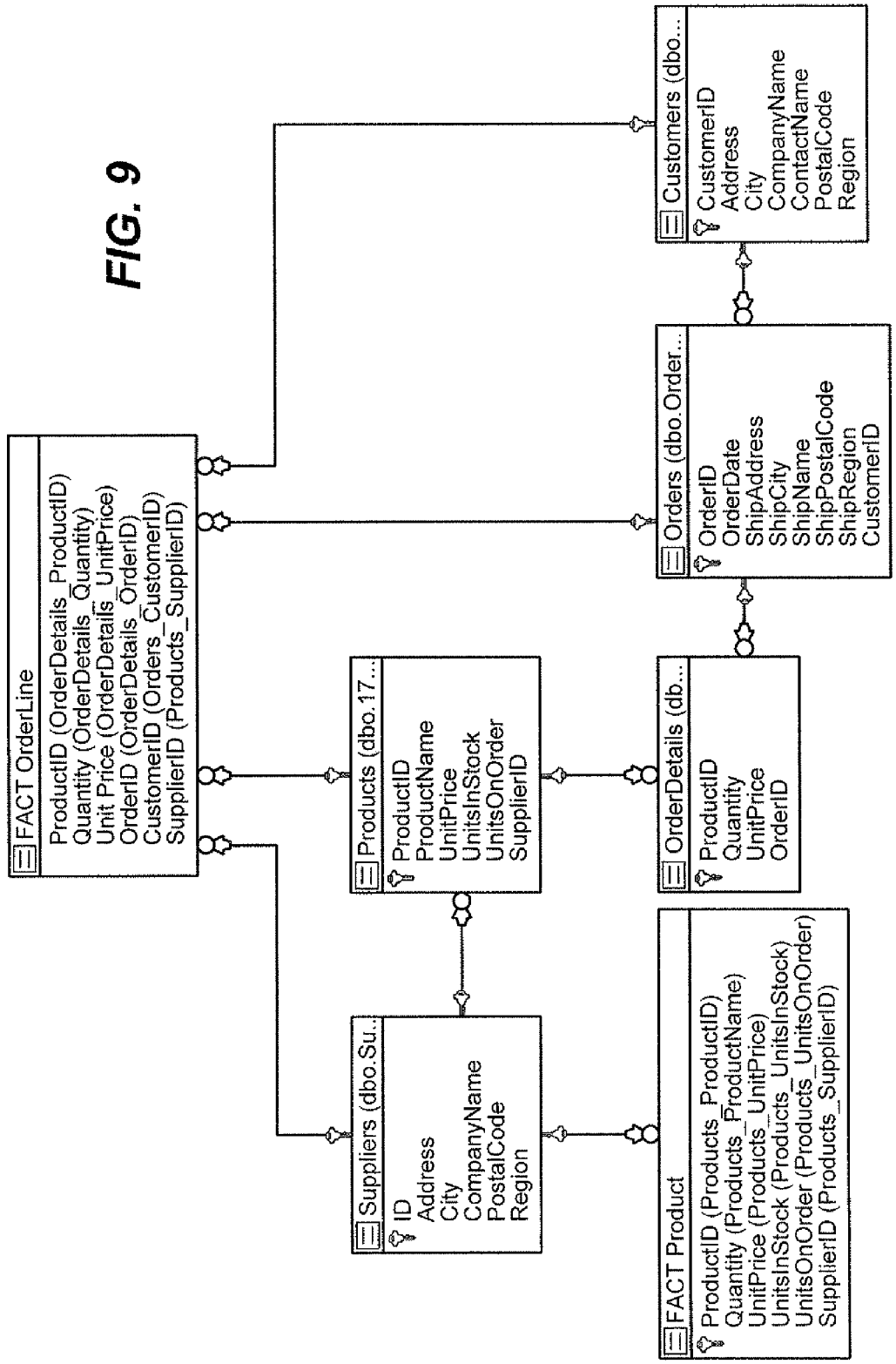
FIG. 9 is a specific example of a dimensional model in accordance with one embodiment of the present invention.

The named queries are then used to create logical view objects for the dimensional model. This is indicated by block 408. A dimensional model cube is then built for each logical table object, with other table objects linked to it as dimensions. This is indicated by block 410. FIG. 8 illustrates one exemplary class diagram for a generalized form of a multi-dimensional object in the dimensional model. FIG. 9 illustrates one exemplary dimensional model materialized and illustrating the foreign key relationships between the Fact table and the various dimensions associated with it.

Appendix C illustrates another embodiment of pseudo code illustrating how model services system 250 calls the various components thereof in order to implement the functionalities discussed.

It should be noted, at this point, that the dimensional model, an example of which is shown in FIG. 9, has been automatically generated by inferring foreign key relationships from the structure (compositions and associations) in the object model. The user can query the automatically generated dimensional model using tools designed for that purpose. As discussed above, MDX is a language designed to query a dimensional database.

Figure 10:
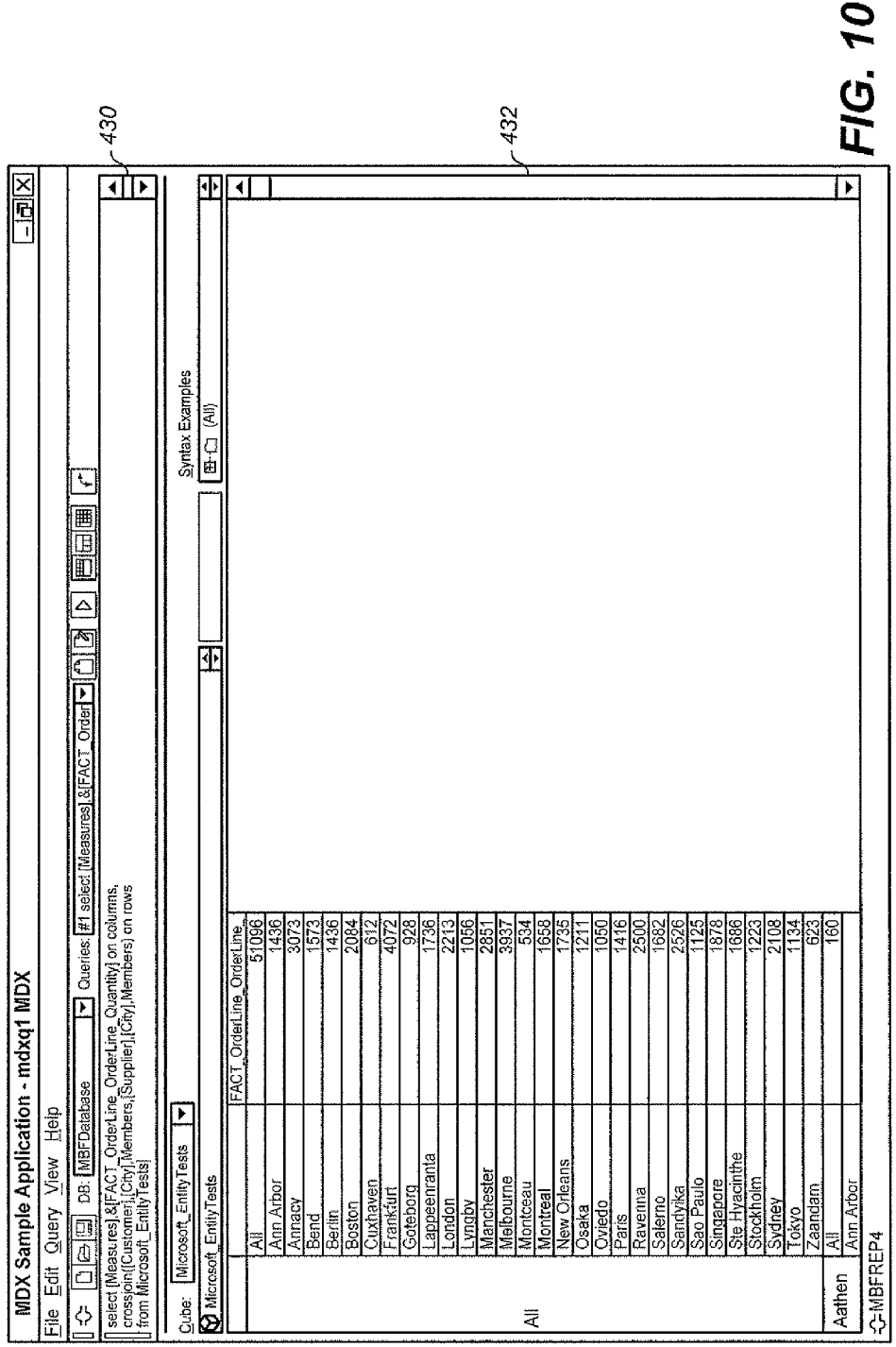
FIG. 10 illustrates one embodiment of an example query to a dimensional model and corresponding result set.

An exemplary query for querying the dimensional model illustrated by FIG. 9 is shown in FIG. 10. FIG. 10 shows a screen shot having a query field 430 which contains an MDX query expression. FIG. 10 also includes a result field 432 which contains the results returned by the query.

As also indicated above, MDX and other dimensional model querying languages can have fairly complex syntax or be otherwise difficult to learn. Therefore, another embodiment of the present invention converts the automatically created dimensional model into another set of objects referred to herein as BI entities 262 so that they can be queried by users using object oriented expressions, rather than the complicated syntactical expressions required by dimensional model querying languages. To satisfy the reporting requirements of the client it is not enough to query the original object model, because the dimensional model may have a Fact table which has attributes from two different entities in the object model as dimensions thereof. Therefore, in order to make it easier to access the dimensional model, in accordance with one embodiment of the present invention, BI entities 262 are created.

BI entities 262 provide a conventional object oriented view of the underlying dimensional model 258. A user can thus create efficient query criteria and consume dimensional data in a manner in which the actual querying of the dimensional model is performed transparently to the user. BI entities 262 hide the dimensional model details, such as the cube, the dimensions, the hierarchy, the native query language, etc., and the user is only required to use objects and attributes.

Figure 11A:
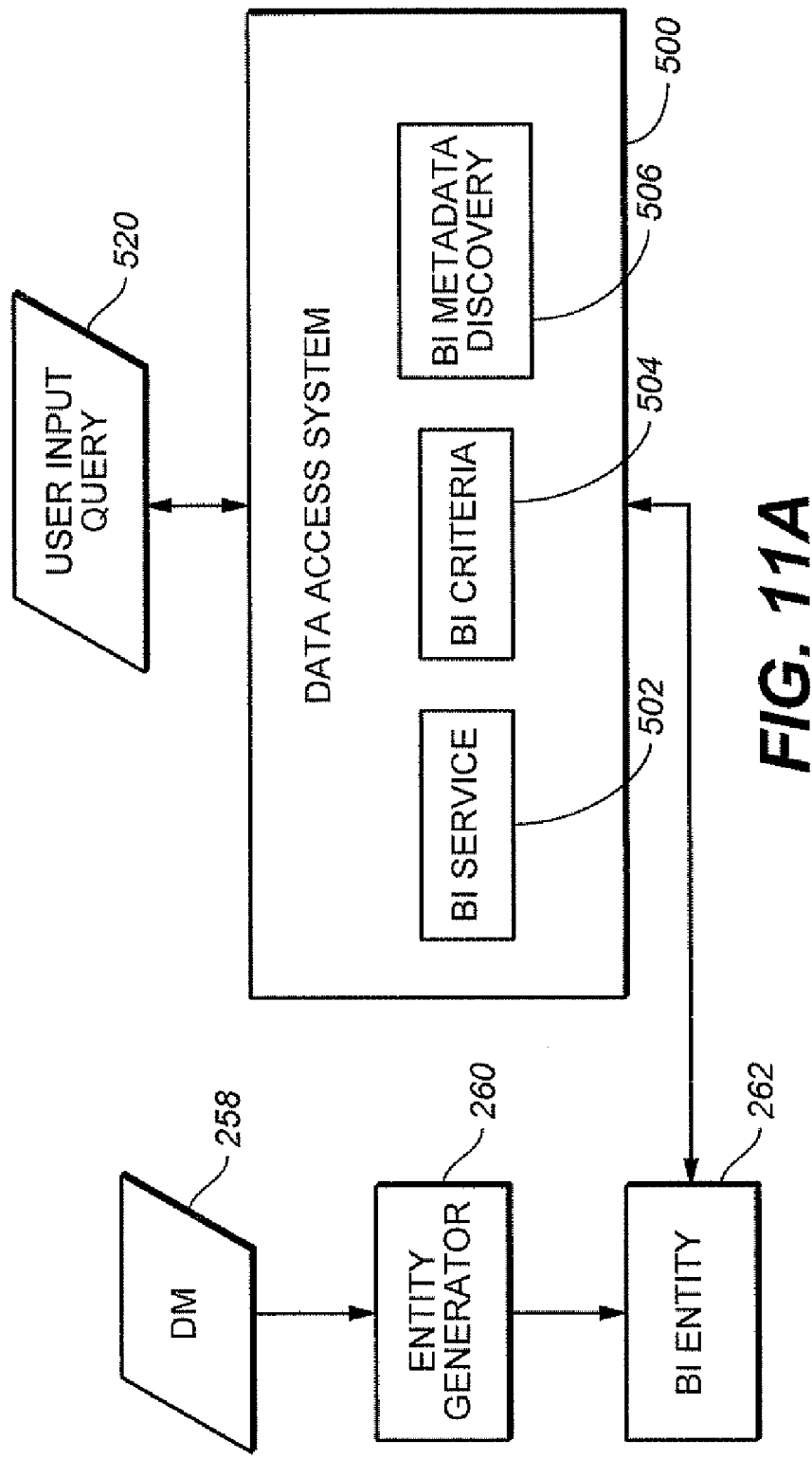
FIG. 11A is a block diagram of a system for creating a business entity and generating reports in accordance with one embodiment of the present invention.
Figure 11B:
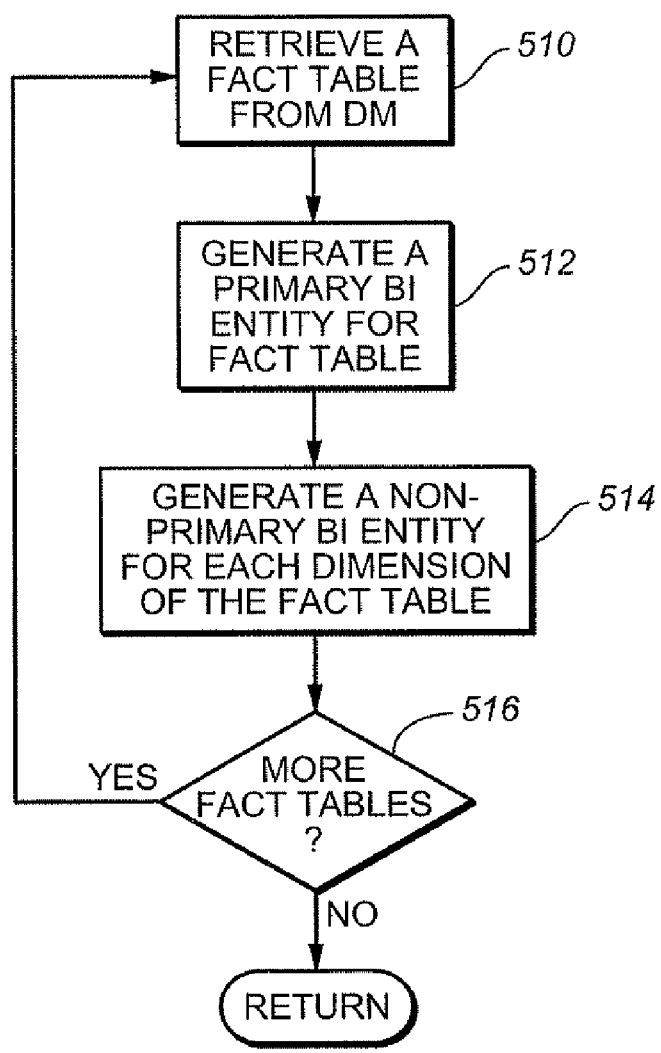
FIG. 11B is a flow diagram illustrating the creation of a business intelligence entity in accordance with one embodiment of the present invention.

FIG. 11A illustrates entity generator 258, along with data access system 500 which, itself, includes a BI service component 502, a BI criteria component 504 and a BI metadata discovery component 506. FIG. 11B is a flow diagram better illustrating how entity generator 258 generates BI entities 262.

In order to generate BI entities 262, recall that entity generator 260 has access to underlying dimensional model 258. Entity generator 260 first retrieves a Fact table from dimensional model 258. This is indicated by block 510 in FIG. 11B. Entity generator 260 then generates a primary BI entity for the Fact table retrieved. The numerical values (or measures) in the Fact table become the properties of the newly created BI entity. Generating a primary BI entity for the retrieved Fact table is indicated by block 512 in FIG. 11B.

Figure 12:
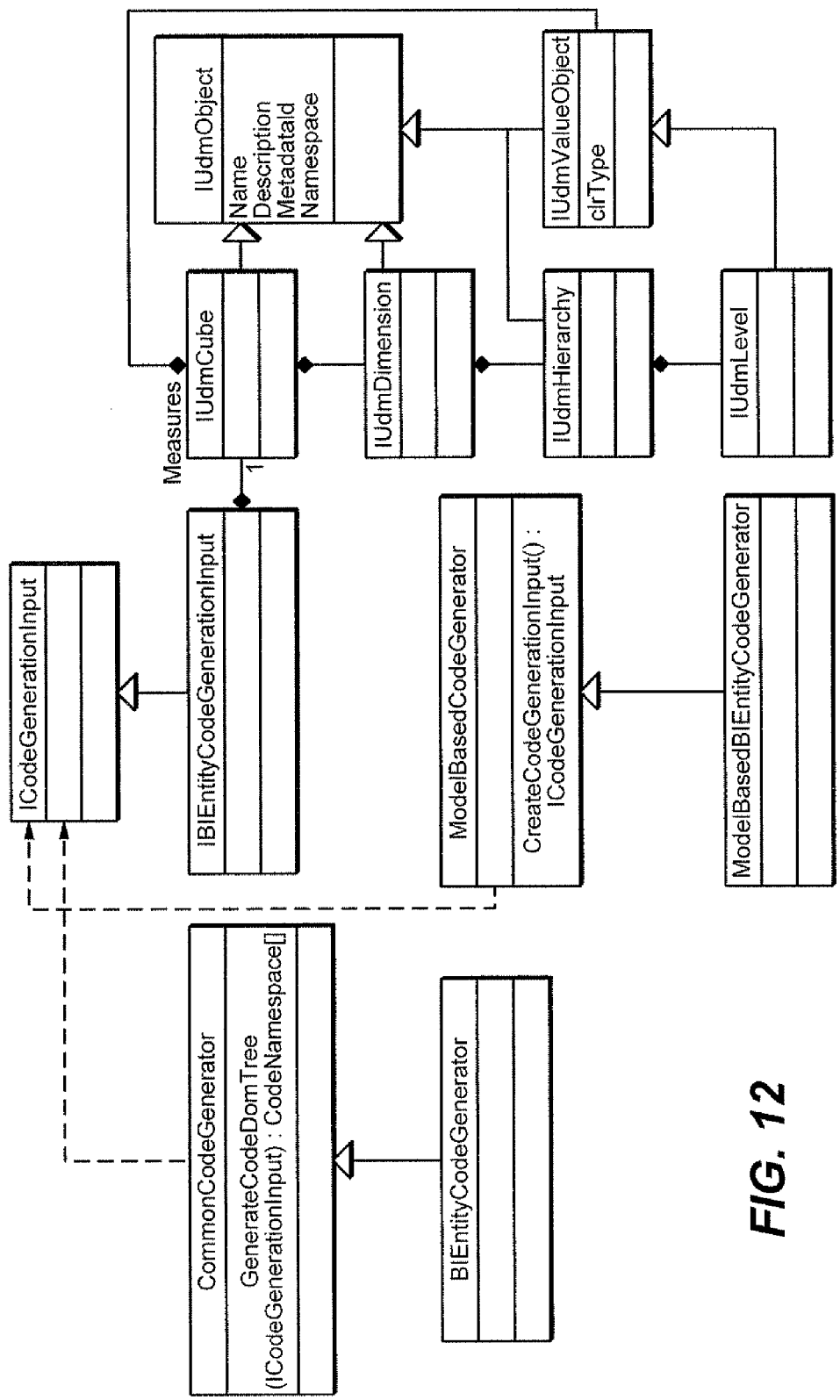
FIG. 12 illustrates one exemplary embodiment of a UML class diagram for a business intelligence entity generator.

Entity generator 260 then generates a non-primary BI entity for each dimension of the Fact table. It should be noted that nested classes can be used to maintain the original structure, hierarchy, and levels of the dimensional model. Generating the non-primary BI entities is indicated by block 514 in FIG. 11B. Entity generator 260 performs these operations for each Fact table in dimensional model 258, as indicated by block 516. FIG. 12 shows an interface implemented by Model Service to generate the code for accessing the dimension model created. The interface allows Model Service to convey information on the structure of the dimensional model to the code generator. A dimensional model consists of a cube with measures and a number of dimensions with hierarchies and attributes. FIG. 12 shows the relationships among these components of the dimensional model. The interface for invoking entity generator 260 is illustrated in FIG. 13. Appendix D illustrates the interfaces supported by the various components of system 250, and by entity generator 260.

Figure 15:
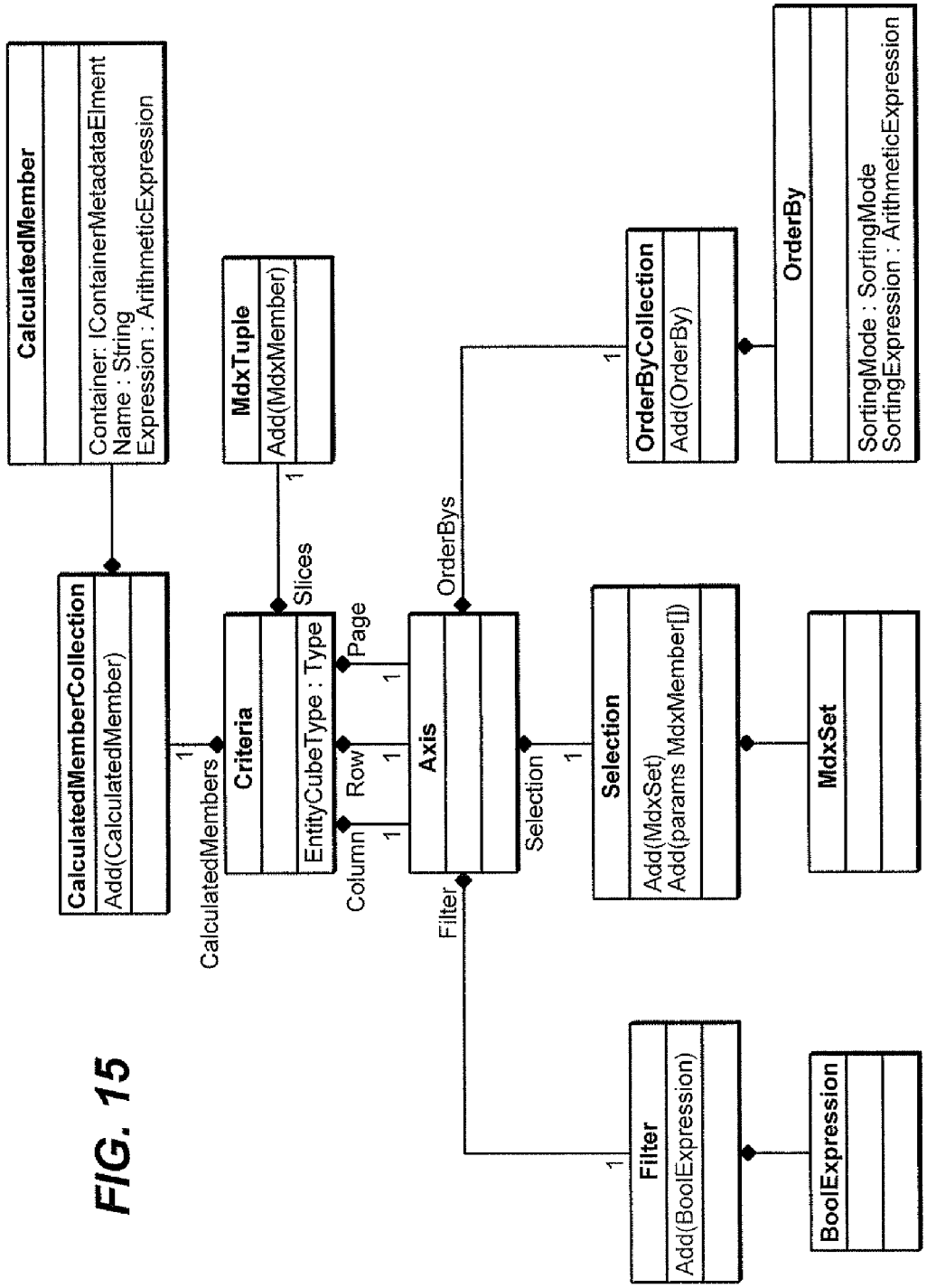
FIG. 15 illustrates one exemplary embodiment of an interface to a BI criteria component.
Figure 16A:
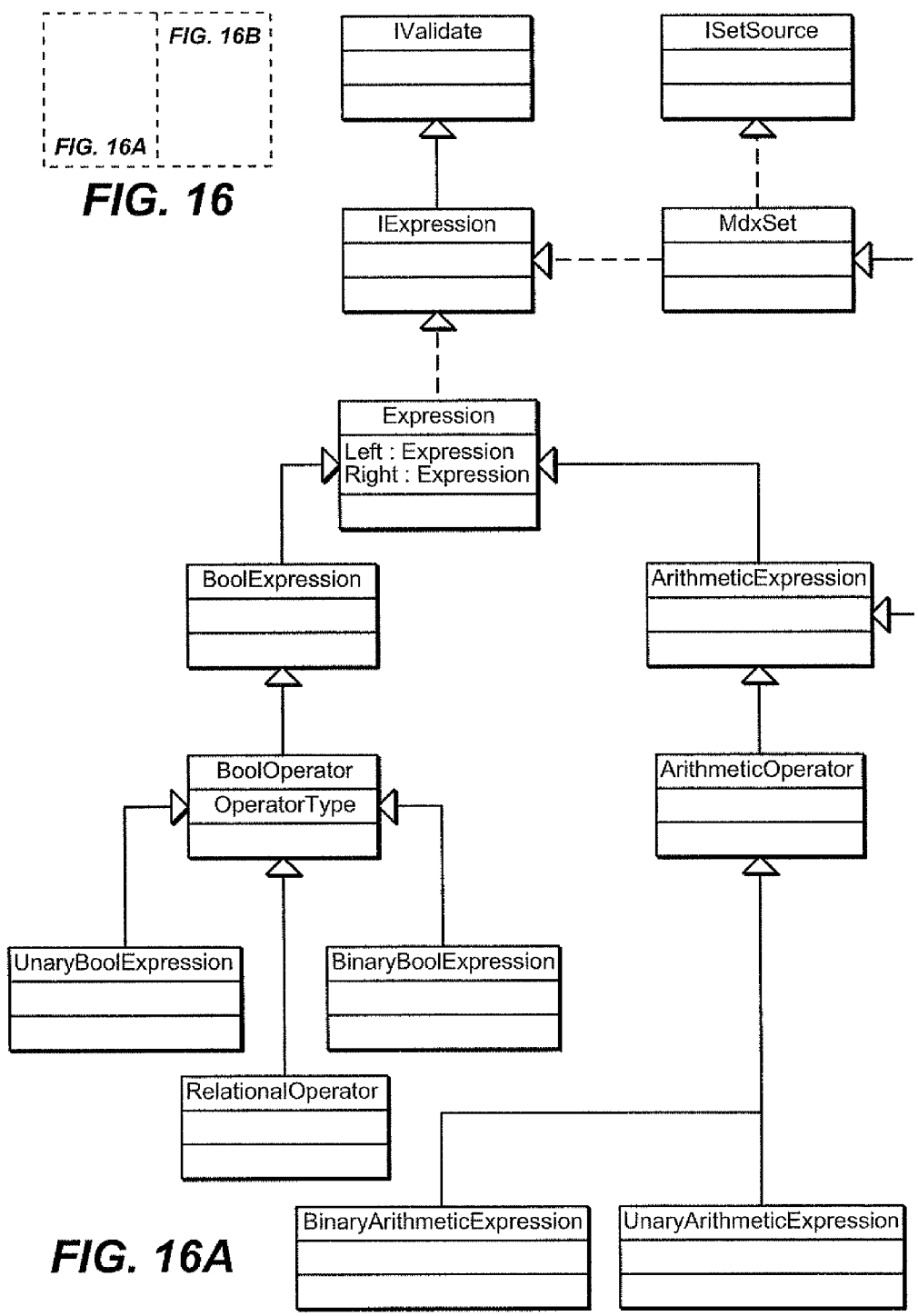
FIG. 16 illustrates one embodiment of a class diagram for a BI criteria component.
Figure 16B:
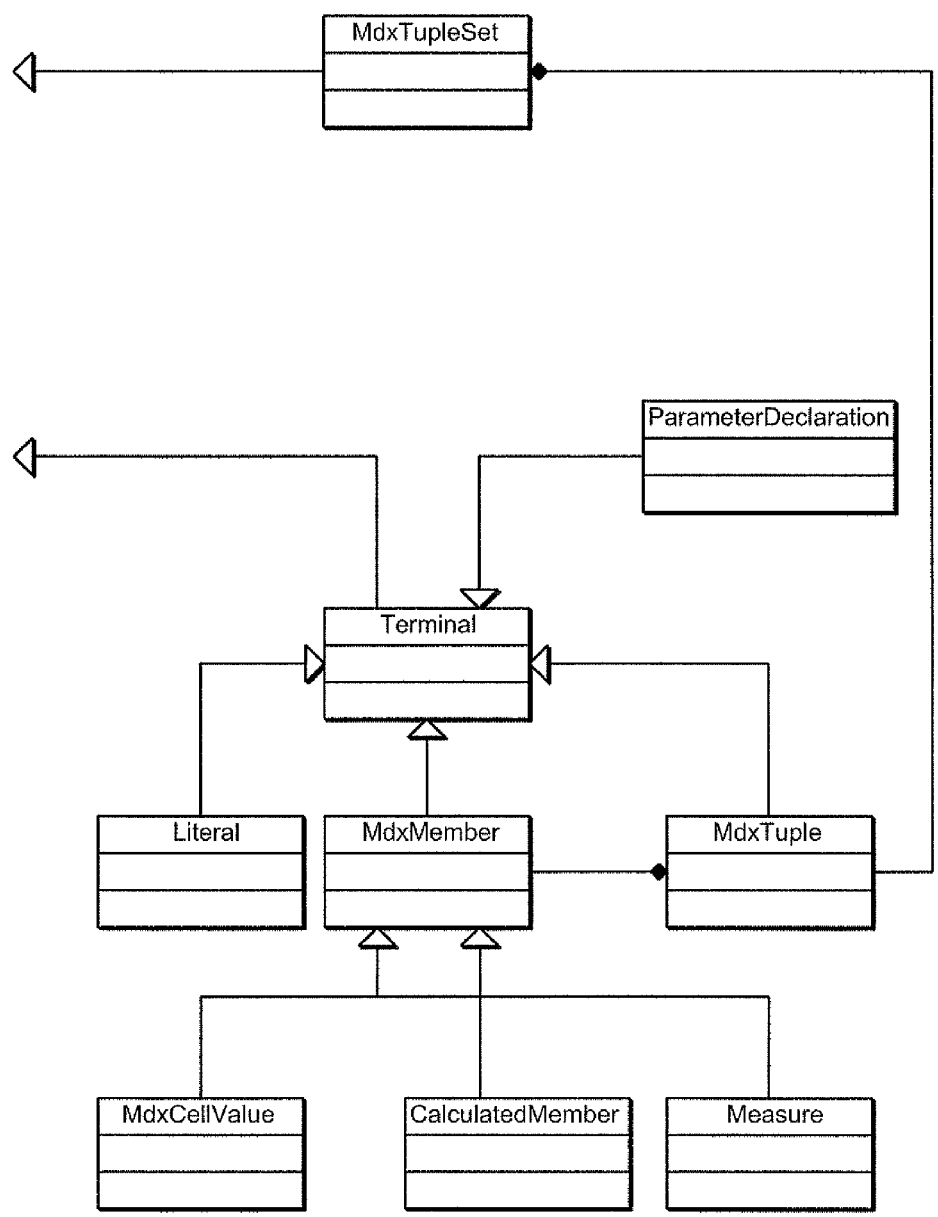

FIG. 14 is a flow diagram better illustrating how data represented by BI entities 262 is accessed using data access system 500. First, a user input query 520 is provided to data access system 500. Receiving the user input query is indicated by block 522 in FIG. 14. BI criteria component 504 illustratively provides an interface through which the user can input user input query 520. The BI criteria interface is illustrated in FIG. 15 and an illustrative class diagram for BI criteria component 504 is illustrated by FIG. 16.

Figure 17:
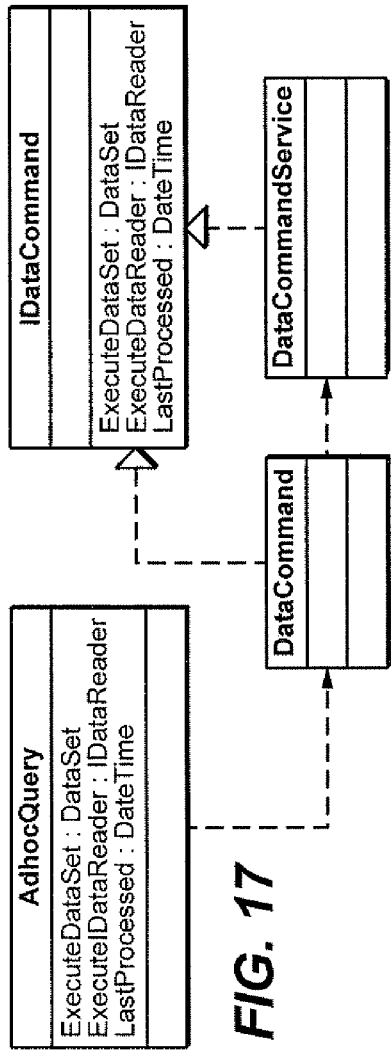
FIG. 17 is an exemplary class diagram of a BI service component.

The user input query 520, input through BI criteria 504, is converted by BI service component 502 into a dimensional model query expression, such as an MDX expression, which can be executed against the dimensional model 258. One exemplary class diagram for BI service component 502 is illustrated in FIG. 17. Translation of the user input query 520 into the dimensional model query and execution of the dimensional model query against the dimensional model are indicated by blocks 524 and 526 in FIG. 14. Of course, MDX is used as an example only, and any of a wide variety of different dimensional model query expressions can be supported by the BI criteria component 504. The following is one exemplary list of MDX expressions which are supported by BI service component 502 and BI criteria component 504, although it should be emphasized that other, different, or additional expressions can be supported as well:

MDX set functions supported:

Cross join, children, descendants, ancestors, all members, members, etc.;

MDX member functions supported:

CurrentMember, DefaultMember, FirstChild, LastChild, Lead, Lag, etc. . . . ;

MDX numeric functions supported:

Average, Aggregate, count, sum, max, min, median, IIF, etc. . . .

Table 1 lists one exemplary set of MDX operators which are supported.

TABLE 1

Supported Operators

| MDX Operators | Equivalent C# Operators |
| --- | --- |
| + (Arithmetic) | + |
| − (Arithmetic) | − |
| * (Arithmetic) | * |
| / (Arithmetic) | / |
| < (Comparison) | < |
| > (Comparison) | > |
| <= (Comparison) | <= |
| >= (Comparison) | >= |
| < > (Comparison) | != |
| = (Comparison) | == |
| AND (Bitwise) | && |
| OR (Bitwise) | \|\| |
| NOT (Bitwise) | ! |
| XOR (Bitwise) | ^ |

The following illustrates one exemplary criteria definition which forms the user input query 520 in the C-Sharp programming language.

TABLE 2

Criteria criteria = new Criteria(typeof(Sales));
criteria.CalculatedMembers.Add(Sales.Measures, "TotalSales", Sales.SaleDollars * Sales.SaleUnits);

TABLE 2-continued

//criteria with column selection
criteria.Column.Selection.Add(Sales.Measures.AllMembers( ));
//criteria added with row selection
criteria.Row.Selection.Add(Sales.Product.Category.Category.Members( ));
criteria = new Criteria(typeof(Sales));
criteria.CalculatedMembers.Add(Sales.Measures, "Profitable", Sales.SaleDollars > Sales.Expense);
//criteria with column selection
criteria.Column.Selection.Add(Sales.Measures.AllMembers( ));

After the dimensional model query is executed, BI service component 502 then returns a result set as indicated by block 528 in FIG. 14.

Finally, BI metadata discovery component 506 can also be provided. BI metadata discovery component 506 is illustratively provided to perform a system wide BI entity search and to return detailed metadata retrieved for one or more BI entities. Of course, this can be useful to the user.

An example of how data is accessed may be helpful. By way of example, assume that a Sales cube in dimensional model 258 has two measures, SalesUnits and SalesDollars, and one dimension "product" which in turn has only one hierarchy "cat", which in turn, has one level "category". The generated BI class codes illustratively looks as follows:

TABLE 3

```
namespace Microsoft.TestNamespace.SubNameSpace {
  // Sales EntityCube
  [Microsoft.BusinessFramework.ReportingAnalysis.Analytics.Client.MetadataInfo("31236ae6-d9a8-417c-a6c6-abf450a27b1d", "sales")]
  public sealed class Sales :
  Microsoft.BusinessFramework.ReportingAnalysis.Analytics.Client.EntityCube {
    // Product Dimension
    private static Microsoft.TestNamespace.SubNameSpace.Product product = new
    Microsoft.TestNamespace.SubNameSpace.Product(typeof(Sales));
    // SalesUnit Measure
    private static Microsoft.TestNamespace.SubNameSpace.SaleUnits saleUnits = new
    Microsoft.TestNamespace.SubNameSpace.SaleUnits(typeof(Sales));
    // SaleDollars Measure
    private static
    Microsoft.TestNamespace.SubNameSpace.SaleDollars saleDollars = new
    Microsoft.TestNamespace.SubNameSpace.SaleDollars(typeof(Sales));
    // Measures collection
    private static
    Microsoft.BusinessFramework.ReportingAnalysis.Analytics.Client.Measures measures = new
    Microsoft.BusinessFramework.ReportingAnalysis.Analytics.Client.Measures(typeof(Sales));
    // Dimensions collection
    private static
    Microsoft.BusinessFramework.ReportingAnalysis.Analytics.Client.Dimensions dimensions = new
    Microsoft.BusinessFramework.ReportingAnalysis.Analytics.Client.Dimensions(typeof(Sales));
    // Product Dimension
    public static Microsoft.TestNamespace.SubNameSpace.Product
    Product {
      get {
        return product;
      }
    }
    // SalesUnit Measure
    public static Microsoft.TestNamespace.SubNameSpace.SaleUnits
    SaleUnits{
      get {
        return saleUnits;
      }
    }
```

TABLE 3-continued

```
    // SaleDollars Measure
    public static Microsoft.TestNamespace.SubNameSpace.SaleDollars
SaleDollars {
        get {
            return saleDollars;
        }
    }
    // Measures collection
    public static
Microsoft.BusinessFramework.ReportingAnalysis.Analytics.Client.Measures Measures {
        get {
            return measures;
        }
    }
    // Dimensions collection
    public static
Microsoft.BusinessFramework.ReportingAnalysis.Analytics.Client.Dimensions Dimensions {
        get {
            return dimensions;
        }
    }
}
namespace Microsoft.TestNamespace.SubNameSpace {
    // Product Dimension
[Microsoft.BusinessFramework.ReportingAnalysis.Analytics.Client.MetadataInfo("efee9c2f-e003-43b4-a1cc-0741b72d0823", "Product")]
    public sealed class Product :
Microsoft.BusinessFramework.ReportingAnalysis.Analytics.Client.Dimension {
        // Category Hierarchy
        private
Microsoft.TestNamespace.SubNameSpace.ProductNamespace.Category
category;
        public Product(System.Type entityCubeType) :
            base(entityCubeType) {
                this.category = new
Microsoft.TestNamespace.SubNameSpace.ProductNamespace.Category
(this);
        }
        // Category Hierarchy
        public
Microsoft.TestNamespace.SubNameSpace.ProductNamespace.Category
Category
        {
            get {
                return this.category;
            }
        }
    }
}
namespace
Microsoft.TestNamespace.SubNameSpace.ProductNamespace {
        // Category Hierarchy
[Microsoft.BusinessFramework.ReportingAnalysis.Analytics.Client.MetadataInfo("1808b148-2c5f-46fa-aa4c-102c7e0929cd", "category")]
    public sealed class Category :
Microsoft.BusinessFramework.ReportingAnalysis.Analytics.Client.Hierarchy {
        // All Level
            private
Microsoft.TestNamespace.SubNameSpace.ProductNamespace.CategoryNamespace.All all;
        // Category Level
            private
Microsoft.TestNamespace.SubNameSpace.ProductNamespace.CategoryNamespace.Category category;
            public
Category(Microsoft.TestNamespace.SubNameSpace.Product parent) :
            base(parent) {
                this.all = new
Microsoft.TestNamespace.SubNameSpace.ProductNamespace.CategoryNamespace.All(this);
                this.category = new
Microsoft.TestNamespace.SubNameSpace.ProductNamespace.CategoryNamespace.Category(this);
        }
```

TABLE 3-continued

```
        // All Level
            public
Microsoft.TestNamespace.SubNameSpace.ProductNamespace.CategoryNamespace.All All
            {
                get {
                    return this.all;
                }
            }
        // Category Level
            public
Microsoft.TestNamespace.SubNameSpace.ProductNamespace.CategoryNamespace.Category Category
            {
                get {
                    return this.category;
                }
            }
        }
    }
namespace
Microsoft.TestNamespace.SubNameSpace.ProductNamespace.CategoryNamespace
{
    // All Level
[Microsoft.BusinessFramework.ReportingAnalysis.Analytics.Client.MetadataInfo("74f06e63-7b3f-46ae-ae03-2c97be8ed4d2", "all")]
    public sealed class All :
Microsoft.BusinessFramework.ReportingAnalysis.Analytics.Client.Level {
            public
All(Microsoft.TestNamespace.SubNameSpace.ProductNamespace.Category parent) :
            base(parent) {
        }
    }
}
namespace
Microsoft.TestNamespace.SubNameSpace.ProductNamespace.CategoryNamespace
{
    // Category Level
[Microsoft.BusinessFramework.ReportingAnalysis.Analytics.Client.MetadataInfo("66068192-c3e2-42a0-9c2f-b76fe70a221e", "category")]
    public sealed class Category :
Microsoft.BusinessFramework.ReportingAnalysis.Analytics.Client.Level {
            public
Category(Microsoft.TestNamespace.SubNameSpace.ProductNamespace.Category parent) :
            base(parent) {
        }
    }
}
namespace Microsoft.TestNamespace.SubNameSpace {
    // SalesUnit Measure
[Microsoft.BusinessFramework.ReportingAnalysis.Analytics.Client.MetadataInfo("cf84c740-787c-48f0-9f28-e800912c04db", "SaleUnits")]
    public sealed class SaleUnits :
Microsoft.BusinessFramework.ReportingAnalysis.Analytics.Client.Measure {
        public SaleUnits(System.Type entityCubeType) :
            base(entityCubeType) {
        }
    }
}
namespace Microsoft.TestNamespace.SubNameSpace {
    // SaleDollars Measure
[Microsoft.BusinessFramework.ReportingAnalysis.Analytics.Client.MetadataInfo("327eabf7-82a7-4de5-9802-68aab18a65b5", "saleDollars")]
    public sealed class SaleDollars :
Microsoft.BusinessFramework.ReportingAnalysis.Analytics.Client.Measure {
        public SaleDollars(System.Type entityCubeType) :
            base(entityCubeType) {
        }
    }
}
```

One example of a user input query input through BI criteria component 504 is as follows:

TABLE 4

```
Criteria criteria = new Criteria(typeof(Microsoft_EntityTest));
//criteria with column selection
criteria.Column.Selection.Add(Microsoft_EntityTest.FACT_Product_Product_UnitsInStock,
    Microsoft_EntityTest.FACT_OrderLine_OrderLine_UnitPrice);
//criteria added with row selection
criteria.Row.Selection.Add(Microsoft_EntityTest.Order.Members( ));
```

Figure 18:
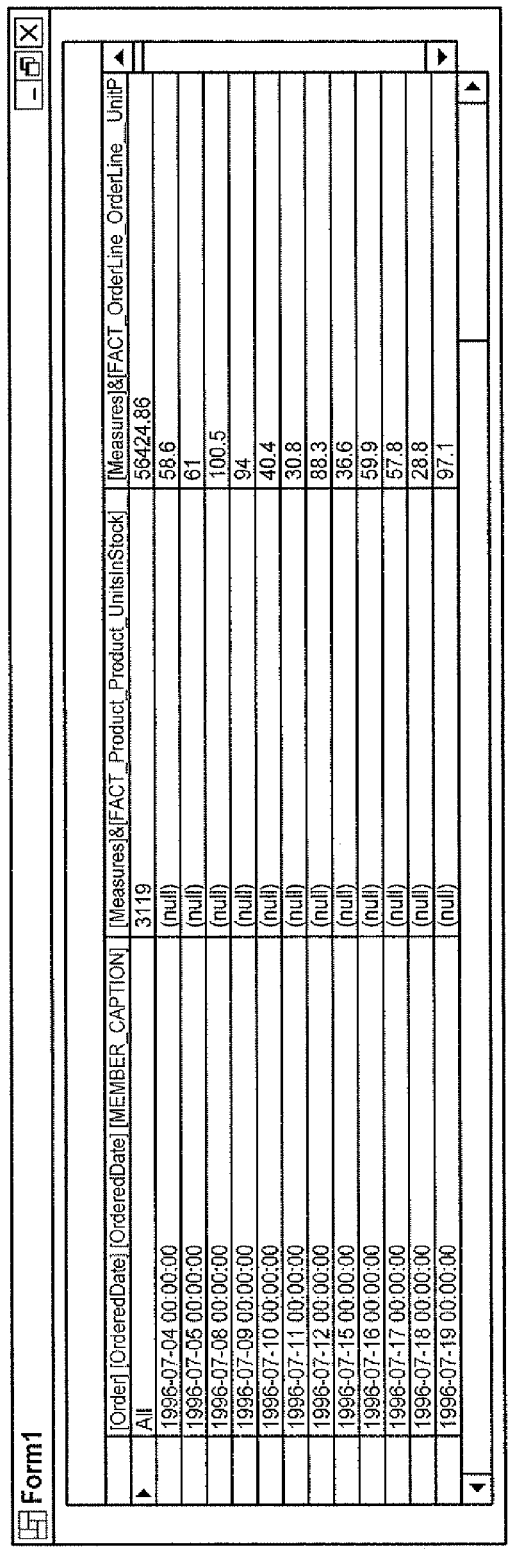
FIG. 18 illustrates one exemplary result set.

An illustrative and exemplary result set returned based on the user input query is shown in FIG. 18.

Navigational service 237 (shown in FIG. 4) is now discussed in greater detail.

Various aspects of the present invention pertain to a system for enabling a user to extract useful information from a collection of business. The foundation underlying navigation service 237 is based upon the identification and user-utilization of navigation paths between related data elements. The general nature of five specific navigation paths will now be described in the context of the data processing environments described in relation to FIG. 4. Detailed data relationships that enable these data navigation paths are described below with respect to FIGS. 19-28.

As was discussed above in relation to FIG. 4, data store 259 illustratively contains data aggregations corresponding to transaction data stored in database 231. The first data navigation path relates to the process of traversing from an OLAP data element to corresponding transaction data. For the purpose of illustration, this navigation path will hereafter be referred to as "drill down" navigation (also can be referred to as "drill through" navigation).

Figure 19:
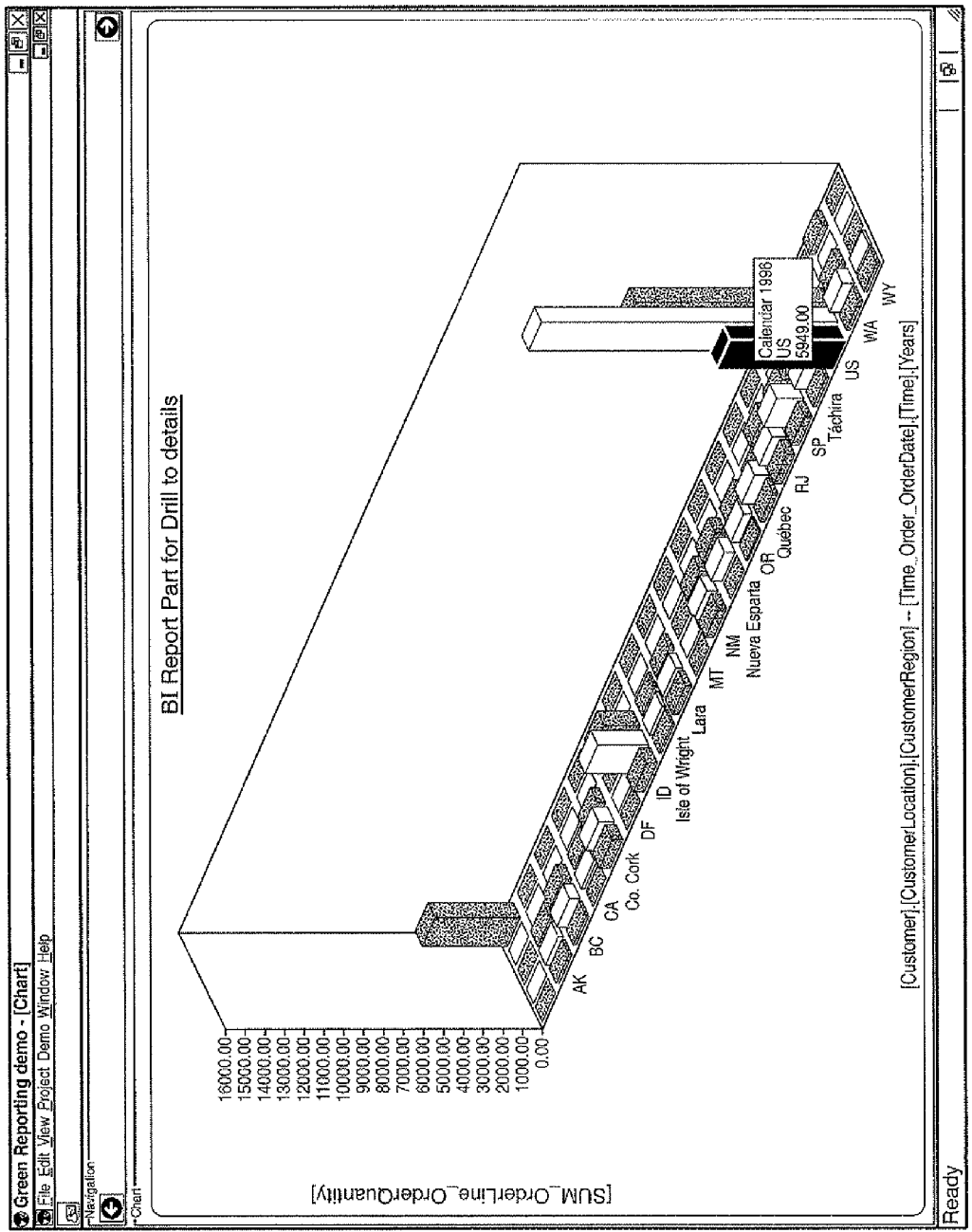

An example will help to describe the nature of a drill down navigation. FIG. 19 is a screen shot demonstrating a presentation of aggregated data (e.g., OLAP data) to a user of a business application. The screen shot shows a graph illustrating the fact that a company's sales for calendar 1996 in the U.S. was $5,949.00. Assuming the user is interested in figuring out all of the U.S. customers that purchased the associated product in 1996, he can illustratively use a drill down navigation. Through a drill down navigation, the user is able to drill down to a customer transaction table. FIG. 20 is an example of a screen shot demonstrating the result of the drill down navigation, which is a customer transaction table showing U.S. customers who purchased the relevant product in calendar 1996.

The second data navigation path involves moving from transactional data to an associated aggregated collection of data (e.g., from transactional data to corresponding OLAP data, or from database 231 data to data in data store 259). For the purpose of illustration, this process of moving from transactional data to aggregated data is hereafter referred to as "drill up" navigation.

Figure 21:
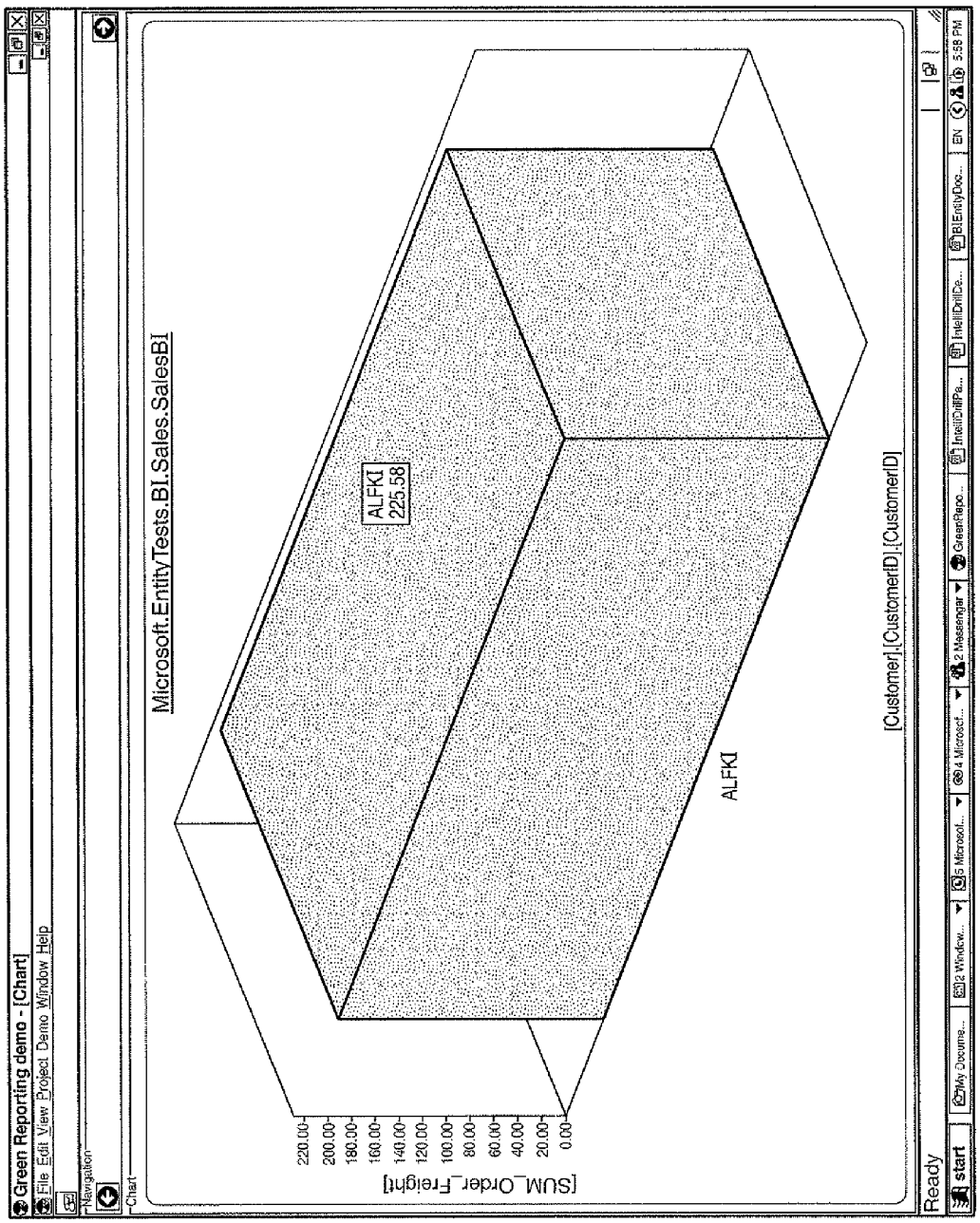

An example will help to describe the nature of a drill up navigation. The customer transaction table illustrated in the screen shot of FIG. 20 is an appropriate starting point for illustrating a drill up navigation. Each customer in the table has illustratively been assigned a city, as well as an ID category. If a user is interested in determining the aggregated total sales order quantity for all customers under the ID category "ALFKI", a drill up navigation can be utilized to produce such information. FIG. 21 is a screen shot illustrating the result of the drill up navigation and shows a graph showing that the sales order quantity for the customer ID "ALFKI" is 225.58.

It is common for the data in data store 259 to be aggregated into a hierarchical scheme. For example, the following scheme is typical of organization within the data warehouse:

```
CUSTOMER
  -->LOCATION
      -->Region
          -->City
              -->Customer Name
```

Accordingly, an example set of data warehouse data is orgainized as follows:

```
CUSTOMER
  -->LOCATION
      -->Northwest
          -->Seattle
              -->Boeing
          -->Portland
              -->Starbucks
      -->Midwest
          -->Minneapolis
              -->Target
```

Hierarchical schemes are utilized within the data warehouse because they are a relatively natural way to organize data. Given such organization, it becomes relatively simple to query data based on obvious aggregation patterns. For example, in accordance with the above example scheme, a user could easily query to find out what customers are in Portland, or to find out what customers are located in the Northwest, etc.

The third data navigation path involves moving through collections of data that are hierarchically organized. For the purpose of illustration, the third data navigation path will hereafter be referred to as "drill to detail" navigation. A drill to detail navigation enables a user to move through certain levels of data based on inherent hierarchial organization.

Figure 22:
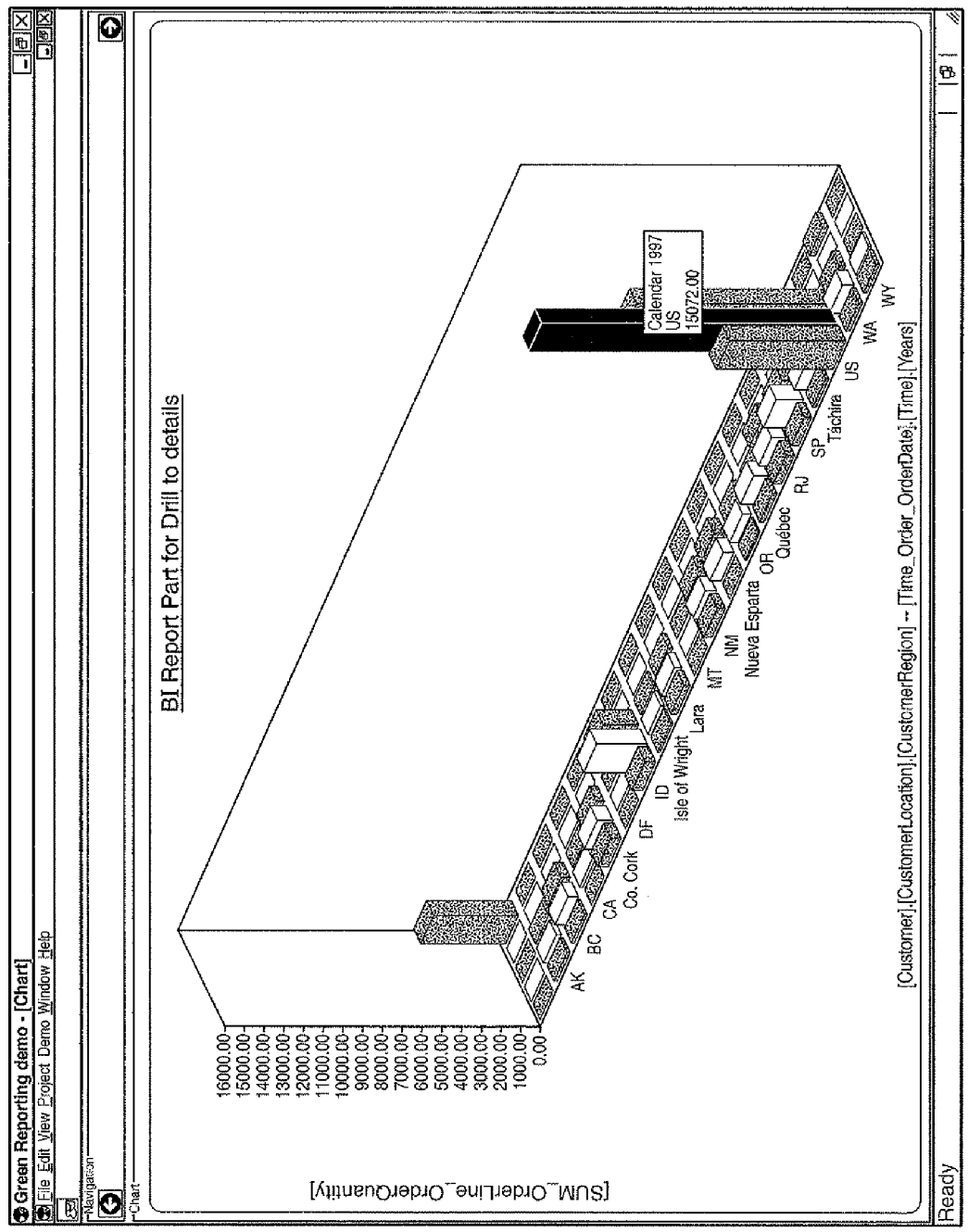
Figure 23:
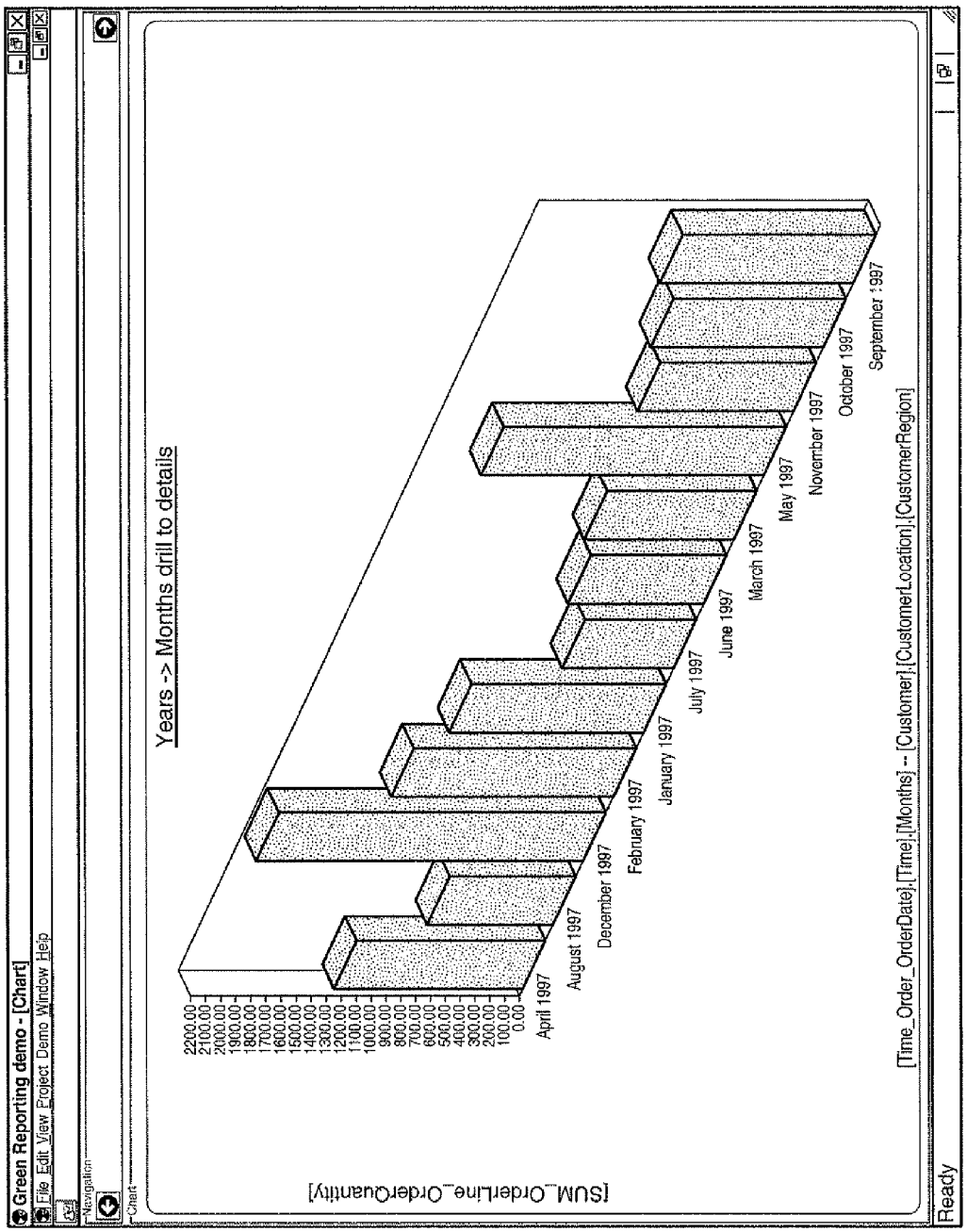

An example will bring light to the nature of a drill to detail navigation. FIG. 22 is an example of a screen shot that provides aggregated information (e.g., data in store 259) to a user of a business application. The screen shot includes a chart showing that U.S. sales for a company in calendar 1997 was $15,072.00. Assuming the user wants to see the monthly sales for calendar 1997, he/she can perform a drill to detail navigation. In other words, he/she can drill to the monthly sales for 1997. The ability to move between data sets in this manner is illustratively supported by the hierarchical organization of data store 259. FIG. 23 is a screen shot example showing a graph that represents monthly sales for 1997. The user is illustratively able to drill from the FIG. 22 aggregation to the narrower FIG. 23 aggregation.

It is possible for data, such as data in data store 259, to be organized in association with a framework that includes a multi-dimensional star-oriented schema, a simple example of which is illustrated in FIG. 24. Within FIG. 24, Sale 800 is associated with two dimensions, namely, customer 801 and product 802. Shipment 810 is associated with the same two dimensions. It should be noted that Sale 800 could just as easily be associated with dimensions that are different than the dimensions of Product 810. In accordance with one embodiment, Sale 800 and Shipment 810 are each independent objects or entities. In accordance with another embodiment, however, Sale 800 and Shipment 810 are independent data stores.

When dimensions are shared as they are in FIG. 24, the stage is set for the fourth data navigation path. For the purpose of illustration, the fourth data navigation path will hence forth be referred to as "drill across" navigation. With a drill across navigation, a user is able to navigate from a first object (or data warehouse) to an object (or data warehouse) that is similarly situated in terms of having a related dimension. For example, with reference to FIG. 24, if a user is looking at a collection of data related to Sale 800, he/she can drill across and view data pertaining to Product 810. A drill across navigation enables the user to switch between sets of inherently related data.

Figure 25:
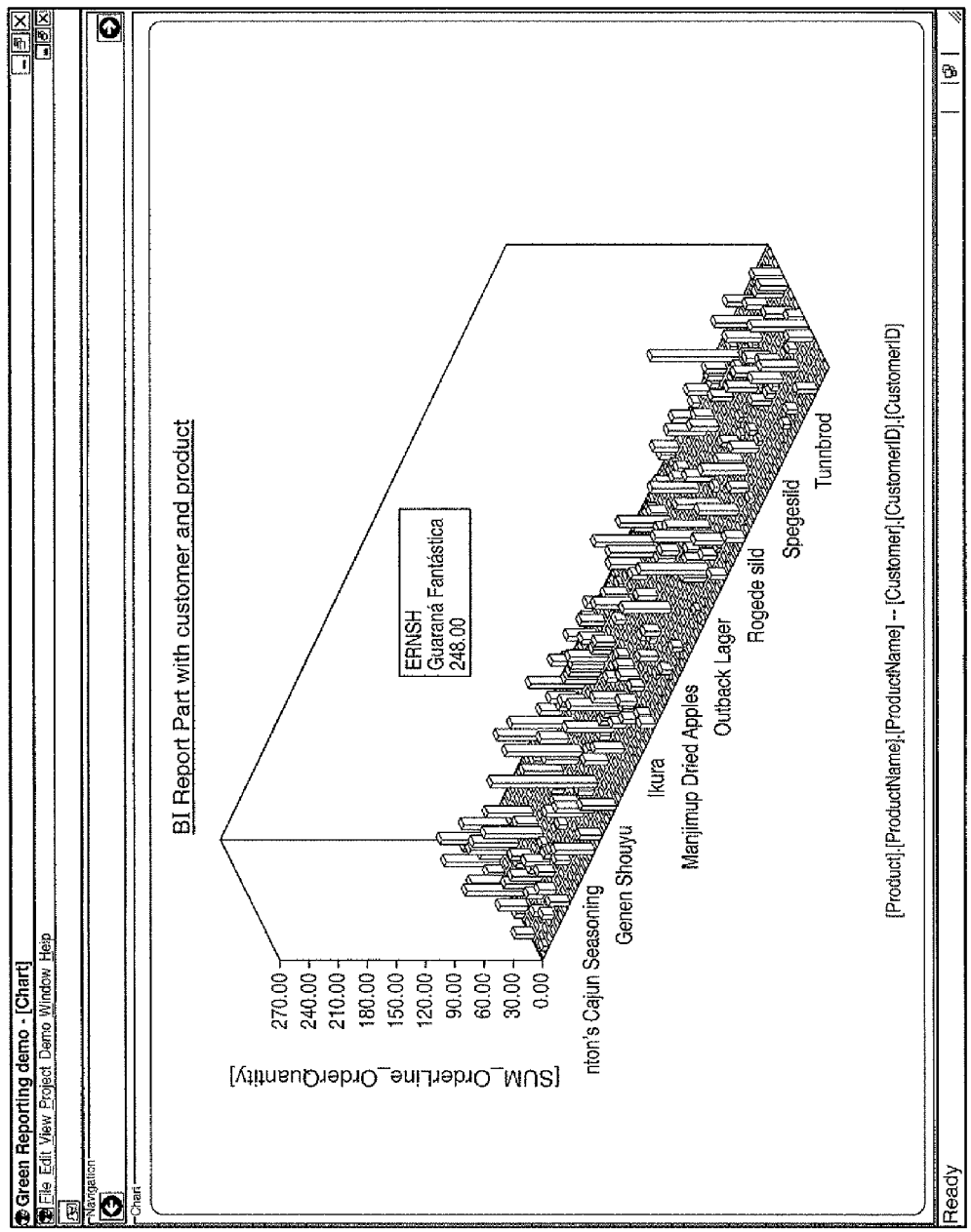
FIGS. 25 and 26 are screen shots demonstrating presentations of data in the context of a business application.
Figure 26:
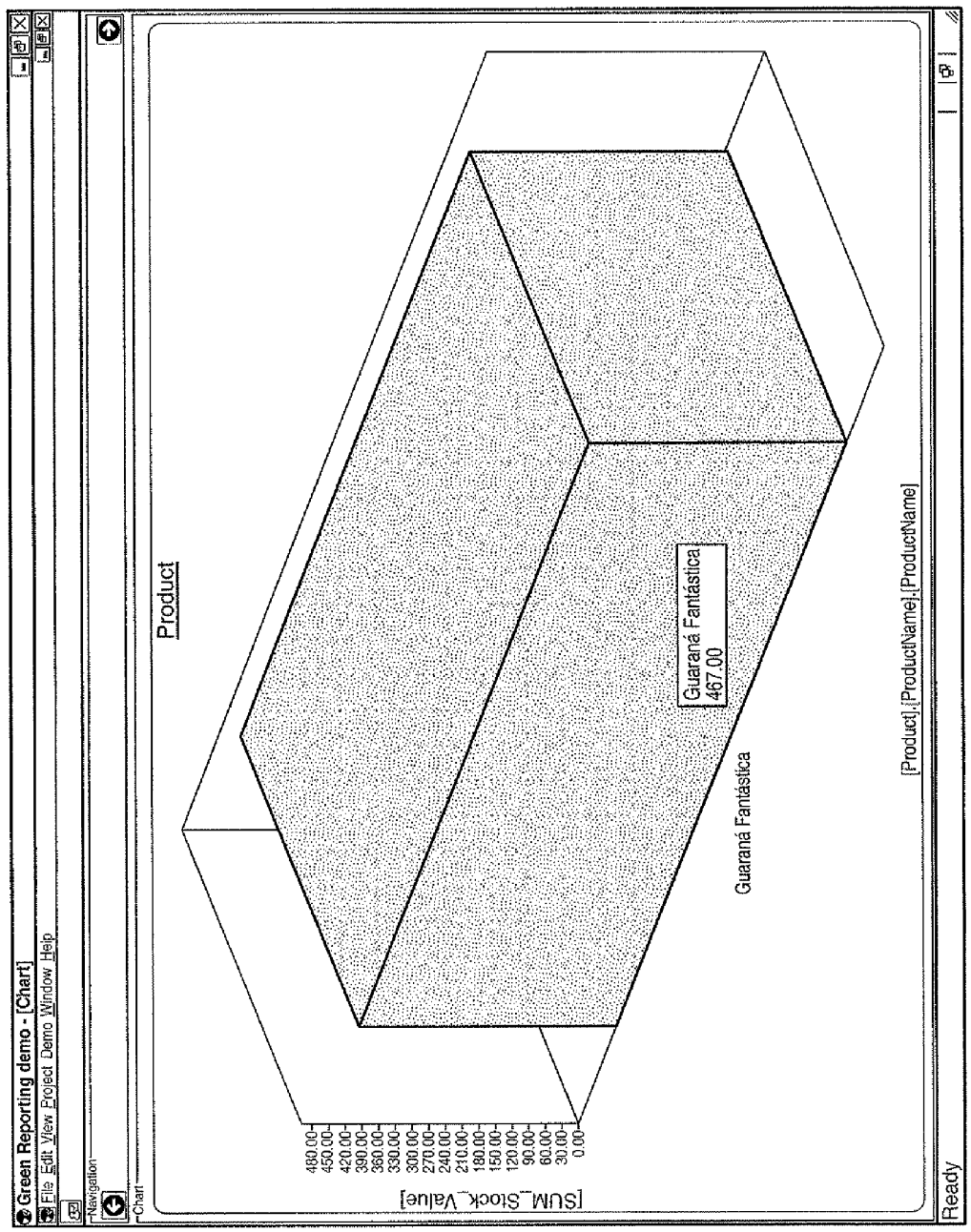

An example will help shed light on the nature of a drill across navigation. FIG. 25 is an illustration of a sample screen shot that contains a portion of a graph that is viewed by a user of a business application. The graph generally presents sales information. More specifically, the graph presents sales order quantity to product relationship data for a company. To simplify the illustration, only a few rows of the graph are shown. A complete graph will include additional rows. It is assumed that the data organization scheme supporting the graph includes a sales data warehouse and a product data warehouse that share the same dimension, namely a product dimension. Accordingly, assuming the user is interested in determining a stock value for a product underlying the graph of FIG. 25, he/she can drill across from the FIG. 25 graph to view stock value information. FIG. 26 is an example of a screen shot having a graph containing a stock value for a product.

In accordance with one embodiment of the present invention, the described fourth navigation path is based on an analysis of a dimensional model (such as UDM 258), or based on a BI entity model (such as BI entities 262). In accordance with one embodiment of the present invention, a fact-to-fact drill across navigation is available in instances where dimensions are shared.

The fifth data navigation path is called an ad hoc logic association navigation, hence forth referred to as a "logic association" navigation. This navigation path is essentially a user-defined shortcut between two sets of related data. In one embodiment, a user applies his/her business knowledge to identify properties within a first data collection that are related to properties in a second data collection. The related properties are then utilized as the basis for a data navigation path between the first and second collections of data.

An example will help to describe the fifth navigation path. A user illustratively creates a "Customer" object within a data warehouse. The same user also illustratively creates a "Customer-Related-Information" object. It is assumed that the user has a fundamental understanding of his/her business. In accordance with the fifth navigation path, the user applies his/her business knowledge to identify a property within the Customer object that is related to a property in the Customer-Related-Information object. The user is allowed to identify the related property relationship ad hoc at run time to enable data navigation between their associated objects. As opposed to the previously described four data navigation paths, the fifth path is generally not based on an underlying physical relationship, but instead is based on a user's understanding of his/her business.

In accordance with one embodiment of the present invention, a metadata store is created to catalog relationships between data elements. The above-described data navigation paths are illustratively defined and implemented through analysis of the relationship data in the metadata store.

Figure 27:
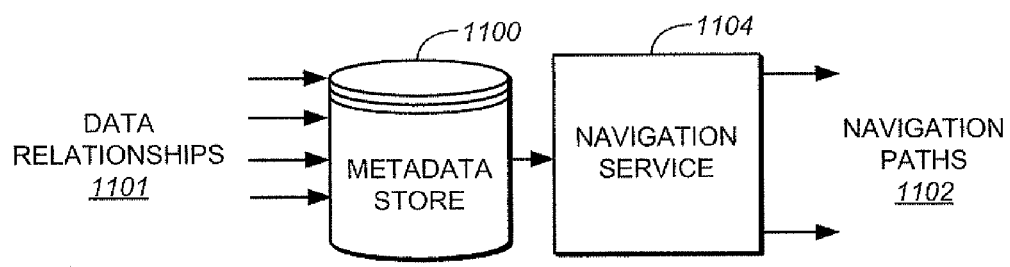
FIG. 27 is a schematic representation demonstrating the origin of navigation paths.

FIG. 27 is a schematic diagram showing the input of data relationship information 1101 into a metadata store 1100. Navigation service 1104 then analyzes information in metadata store 1100 in order to identify certain data relationships that become the basis for implementation of navigation paths 1102. The nature of the services provided by service 1104, as well as an illustrative underlying architecture, will be described below in more detail in relation to other Figures. Suffice it to now say that the data relationships underlying navigation paths 1102 satisfy criteria applied by navigation service 1104 (e.g., criteria are created at runtime based on metadata in the metadata store and current data context input). Navigation paths 1102 are illustratively provided to a user of a business application in some form (e.g., a set of links) to enable intelligent data navigation. The user can illustratively utilize the automatically generated navigation paths to navigate through data in order to improve his/her understanding of data, to analyze data, to make projections, to make informed decisions, etc.

In accordance with one embodiment, the analysis of metadata store 1100 and the identification of navigation paths are performed at run time. Accordingly, with the possible exception of input required for logic association navigations, user knowledge is generally not required to enable utilization of the navigation paths. The navigation paths are identified and provided to the user simply based on data relationships reflected in the data processing system.

Population of metadata store 1100 with data relationship information 1101 will now be described in greater detail. It should be noted, however, that the specific type of relationship data stored within metadata store 1100 can be customized to support a particular navigation path. For example, it is within the scope of the present invention to develop a new navigation path and configure the system to store corresponding relationship data within metadata store 1100, if such data is not already being stored. For the purpose of illustration, examples of relationship data that is stored within metadata store 1100 to support the above-described and other data navigation paths will be described in detail.

It is common for data warehouse 210 (FIG. 2) or data store 259 (FIG. 4) to be organized in accordance with a framework that enables a user to define objects and relationships. An example of such a framework was illustrated and described in relation to FIG. 4B. In accordance with one aspect of the present invention, at least some of the relationships underlying the object-relational framework represent potential navigation paths, and are therefore utilized to populate metadata store 1100. For example, based on a UML object diagram, the relationships between objects (e.g., associations and compositions) represent potential navigation paths and are therefore illustratively identified and cataloged in metadata store 1100. Other known object relationships, such as inheritance relationships, also represent potential navigation paths and are therefore also illustratively cataloged in metadata store 1100.

In accordance with one aspect of the present invention, some of the data relationships 1101 stored in metadata store 1100 are from other sources as well. For instance, the data relationship 1101 in metadata store 1100 are related to mappings 1256, dimensional model 1258 and/or BI entity object model 1262.

Similarly, in accordance with one embodiment, relational mappings of the transition from the regular object model entities 254 (FIG. 4C) to the BI entity object model 262 (FIG. 4C) represent potential navigation paths, and are therefore added to metadata store 1100. For reference, the regular object model objects are business entities, while the objects associated with the OLAP data warehouse object model are BI entities.

The mappings between the business entities and the BI entities are illustratively saved to metadata store 1100. The mappings ultimately enable report navigation between the OLAP and OLTP domains. Also, navigation paths between BI entities are enabled for report navigation, including the ability to look across BI entities and to review transaction data associated with a BI entity.

Figure 28:
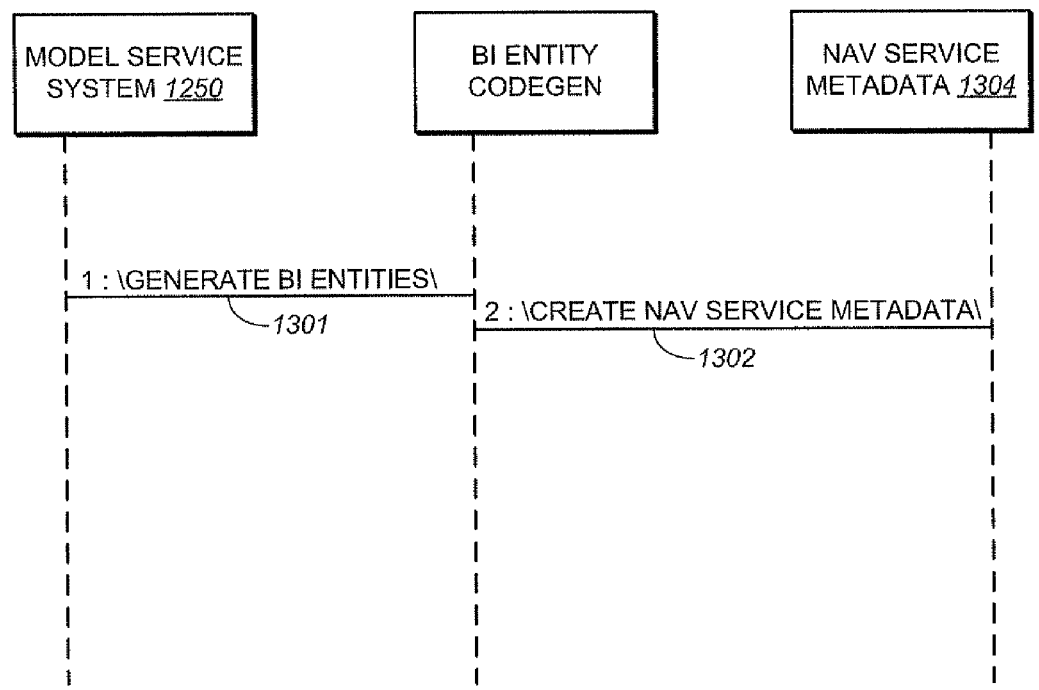
FIG. 28 is a flow illustration demonstrating generation of BI entitiy metadata for an intelligent navigation service.

FIG. 28 is a flow illustration demonstrating generation of BI entity metadata for the described intelligent navigation services. First, in accordance with step 1301, model service system 234 (FIG. 4) generates BI entities. Next, in accordance with step 1302, metadata 1304 is created based on the BI entities for the navigation service.

Exemplary correlations between specific data relationships and navigation paths will now be described, however, the present invention is not limited to the described examples.

In accordance with one aspect of the present invention, drill up and drill down navigation paths are derived based on the relationships between BI entities and their corresponding business entities. As has been described, the mappings generated during the generation of BI entities are cataloged to the metadata store. These mappings are illustratively the foundation that enables drill up and drill down navigations.

In accordance with another aspect of the present invention, model service system 234 is configured to identify the manner in which two UML models are related, and to generate shared dimensions for corresponding dimensional model cubes. Then, BI entities become the natural reflection of the star-oriented model, wherein for each dimension there will be generated one non-primary BI entity. To enable drill across navigation paths, the mappings between non-primary BI entities and their corresponding dimensions are illustratively cataloged to the metadata store. The relationships between BI entities are also identified. Accordingly, when two BI entities refer to the same shared dimension, a drill across is possible.

In accordance with another aspect of the present invention, to enable the foundation for drill to detail navigation paths, hierarchical relationships are cataloged to the metadata store when the BI entity model 262 is generated from the UML model 258 by model service 234.

With reference to FIG. 27 it was described that navigation service 1104 analyzes the data in metadata store 1100 in order to identify and implement navigation paths 1102. In accordance with additional aspects of the present invention, illustrative architectural characteristics and functional methodology will now be described with regard to navigation service 1104.

Figure 29:
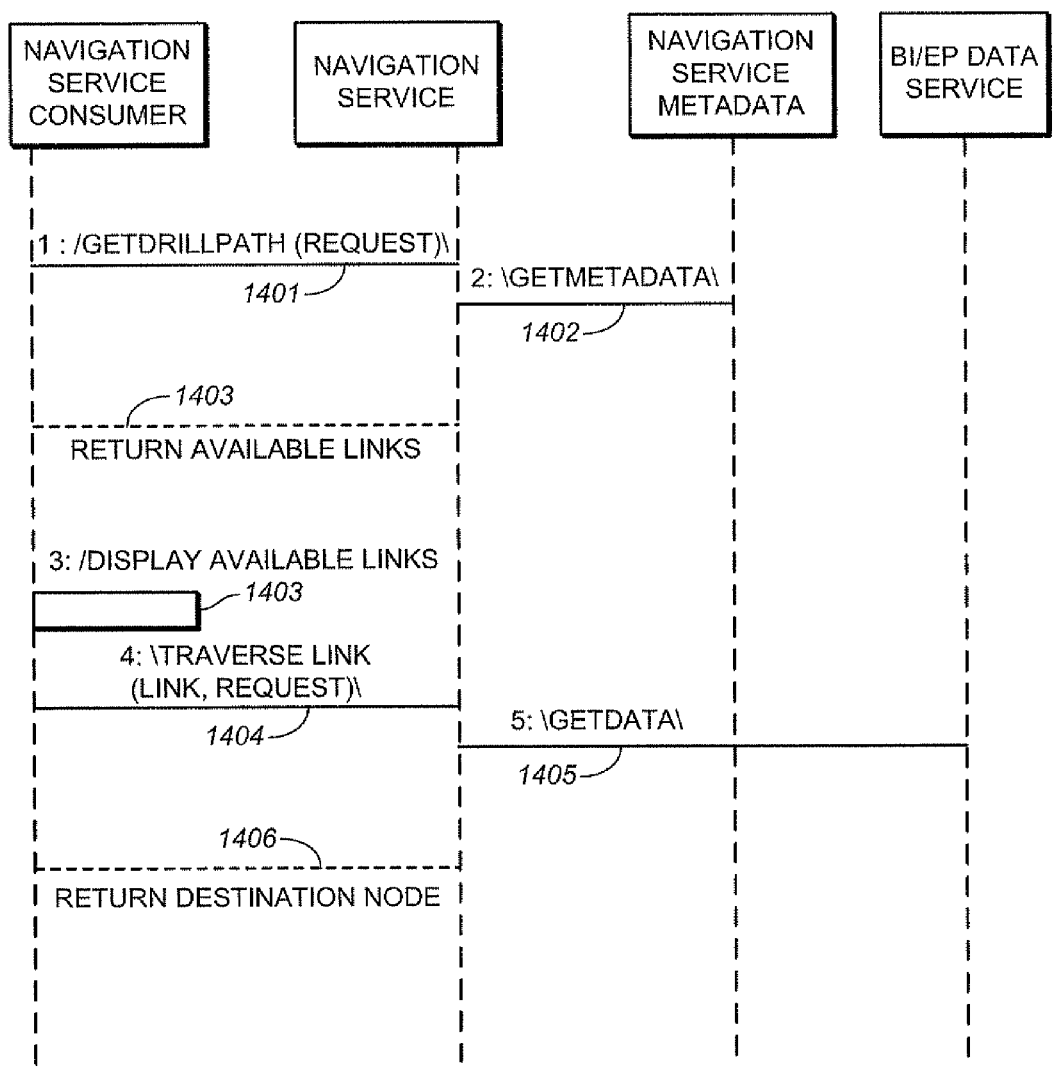
FIG. 29 is a flow illustration demonstrating interaction between a navigation service and a user.

FIG. 29, in accordance with one aspect of the present invention, is a flow illustration demonstrating interaction between the navigation service (e.g., service 1104 in FIG. 27) and a user of the services provided. As is illustrated by step 1401, the process begins when the user transmits a request for data navigation to the navigation service. As is indicated by step 1402, the navigation service responds to the request by reviewing metadata (e.g., metadata stored in store 1100 in FIG. 27). In accordance with one embodiment, the user provides a data context to the navigation service in step 1401. The data context is the starting point for data analysis, such as the current data set being reviewed by the user. The navigation service illustratively reviews metadata based on the received data context to determine what data navigation paths are available to the user based on his/her data context starting point.

In accordance with step 1403, the navigation service provides a plurality of links to the user. The links, which are displayed to the user, represent data navigation paths that are available for execution. The links are identified based on the review of the metadata. As is represented by step 1404, the user selects a link and communicates the selection to the navigation service. In accordance with step 1405, the navigation service retrieves data corresponding to the user's selection. Finally, in accordance with step 1406, the result of the navigation is returned to the user, thereby providing him/her with the desired data set.

Figure 30:
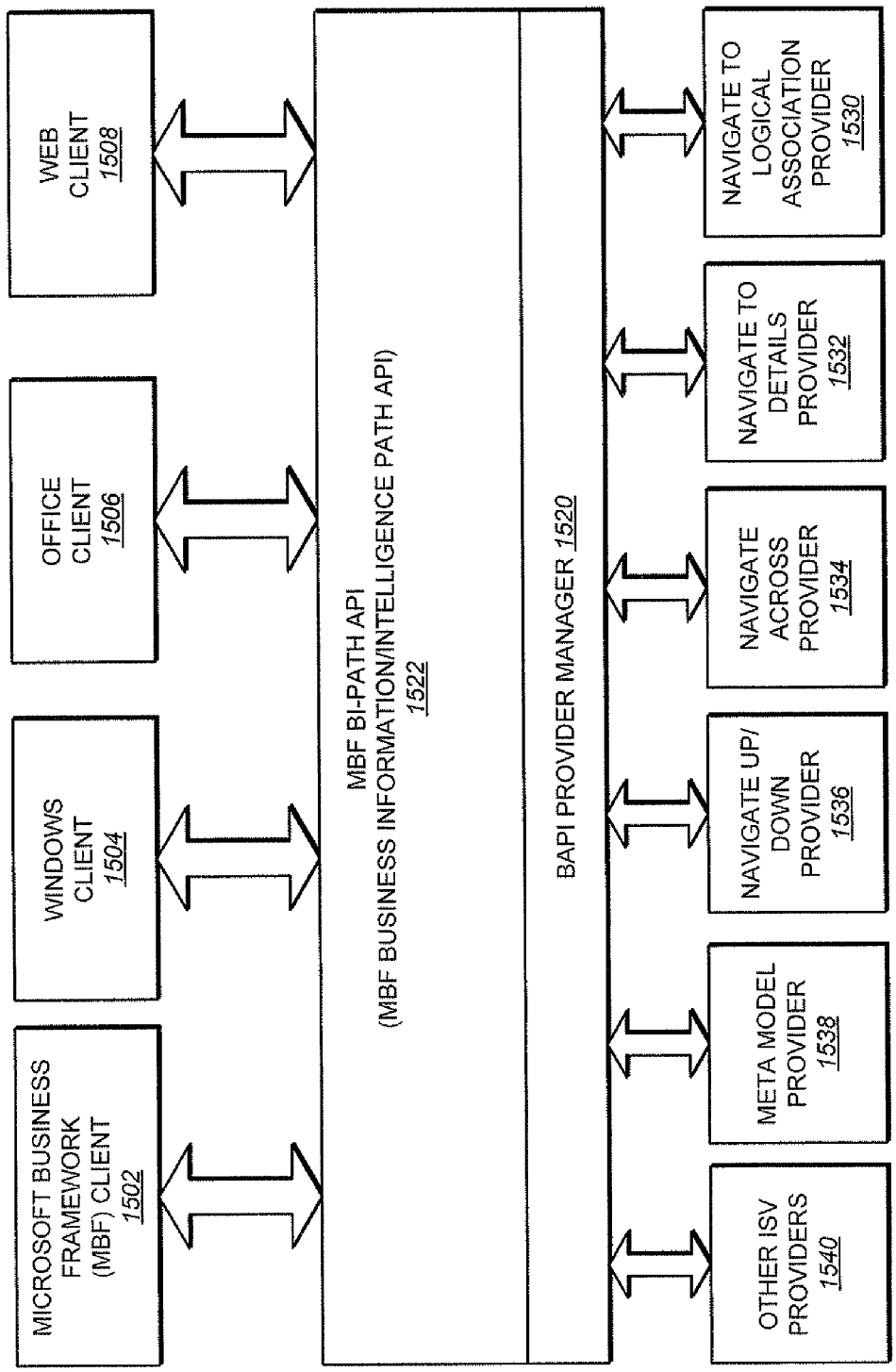
FIG. 30 is a block diagram illustrating a navigation service architecture.

FIG. 30, in accordance with one aspect of the present invention, is a block diagram illustrating a navigation service architecture. The architecture includes, but is not limited to, a plurality of illustrated clients 1502, 1504, 1506 and 1508.

Examples of the clients are now discussed, but these are examples only and do not limit the scope of the invention. Client 1502 is illustratively a client based in the Microsoft Business Framework (MBF) but could by any other framework as well. The Microsoft Business Framework is a set of developer tools and software classes offered by Microsoft Corporation of Redmond, Wash. Client 1504 is illustratively a client based in Windows, an operating system offered by Microsoft Corporation, but could be based on any other operating system as well. Client 1506 is illustratively based in Microsoft Office, a software package offered by Microsoft Corporation, but could be based on any other software package as well. Client 1508 is a more generic identifier representing a web-based client.

In accordance with one embodiment, at least one of the illustrated clients are BAPI clients in that they are configured to support object-oriented programming via an interface defined in terms of objects and methods based in what is known as the Business Application Program Interface (BAPI). In other words, a BAPI client application navigates information using BAPI. To support the BAPI clients, the illustrated architecture includes a BAPI provider manager and an MBF BIPath API 1522, but any other BI path API could be used.

Provider manager 1520 is illustratively configured to operate in conjunction with a plurality of providers. A few specific providers, to which the present invention is not limited, are illustrated in FIG. 30. Providers 1536, 1534, 1532 and 1530 are configured to support different types of navigation, such as navigation based on analysis of BI Entity data, as described herein. Provider 1538 illustratively provides navigation via analysis of metamodel data. Provider 1540 is a generic block indicating other providers that the architecture can easily be extended to support (e.g., navigation based on other sources). At least one provider is illustratively a BAPI provider configured to operate in conjunction with the other BAPI components of the architecture.

In accordance with one aspect of the present invention, one of the BAPI clients sends a navigation Request to BAPI provider manager 1520 through BAPI. The BAPI provider manager then either delegates the Request to a set of specific providers or broadcasts to all providers. The BAPI provider manager 1520 then aggregates results returned from different providers and sends them back to the requesting BAPI client.

In accordance with one embodiment, when a new BAPI provider is implemented, it will implement the BAPI API and extend the Request/Response objects if necessary to provide additional functionality. The new BAPI provider will then be plugged into the BAPI provider manager 1520 and make itself available for requests. After this, the BAPI client will be able to request the service from the new BAPI provider to obtain any additional offered functionality.

Accordingly, a BAPI client includes an application that navigates information using BAPI. The BAPI, which will illustratively be exposed, is the principle interface implemented by a BAPI provider. A BAPI providers is an implementation of BAPI API: a BAPI client navigates to obtain a different information perspective vua a BAPI provider. The framework can then be extended through implementation of future/other providers through the similar Request/Response object exchange format. There therefor can be type specific BAPI providers (Hypermedia providers, BIPath providers, etc.). This can be done through implementation of BAPI in a provider specific mannerto support custom Request/Response objects. The BAPI provider plugs itself into the BAPI provider manager and is used by the BAPI client in a delegation (if type is specified)/broadcasting pattern.

It should be emphasized that the client systems involved can be web services or non-web services. The submitted Requests illustratively, although not necessarily, include a data context used by a provider in the creation of a Response. In accordance with one embodiment, certain providers are associated with their own particular type of data navigation path. For its type of path, the navigation provider is configured to identify corresponding navigation paths based on a received Request.

In accordance with one embodiment, when a new type of data navigation path is desired, a corresponding new provider is simply registered and integrated. Accordingly, any entity can illustratively develop a navigation path provider to expand on the types of navigations available to client users. In other words, the provider layer is essentially plug-and-play with the service layer to enable relatively simple extensions of service functionality.

Figure 31:
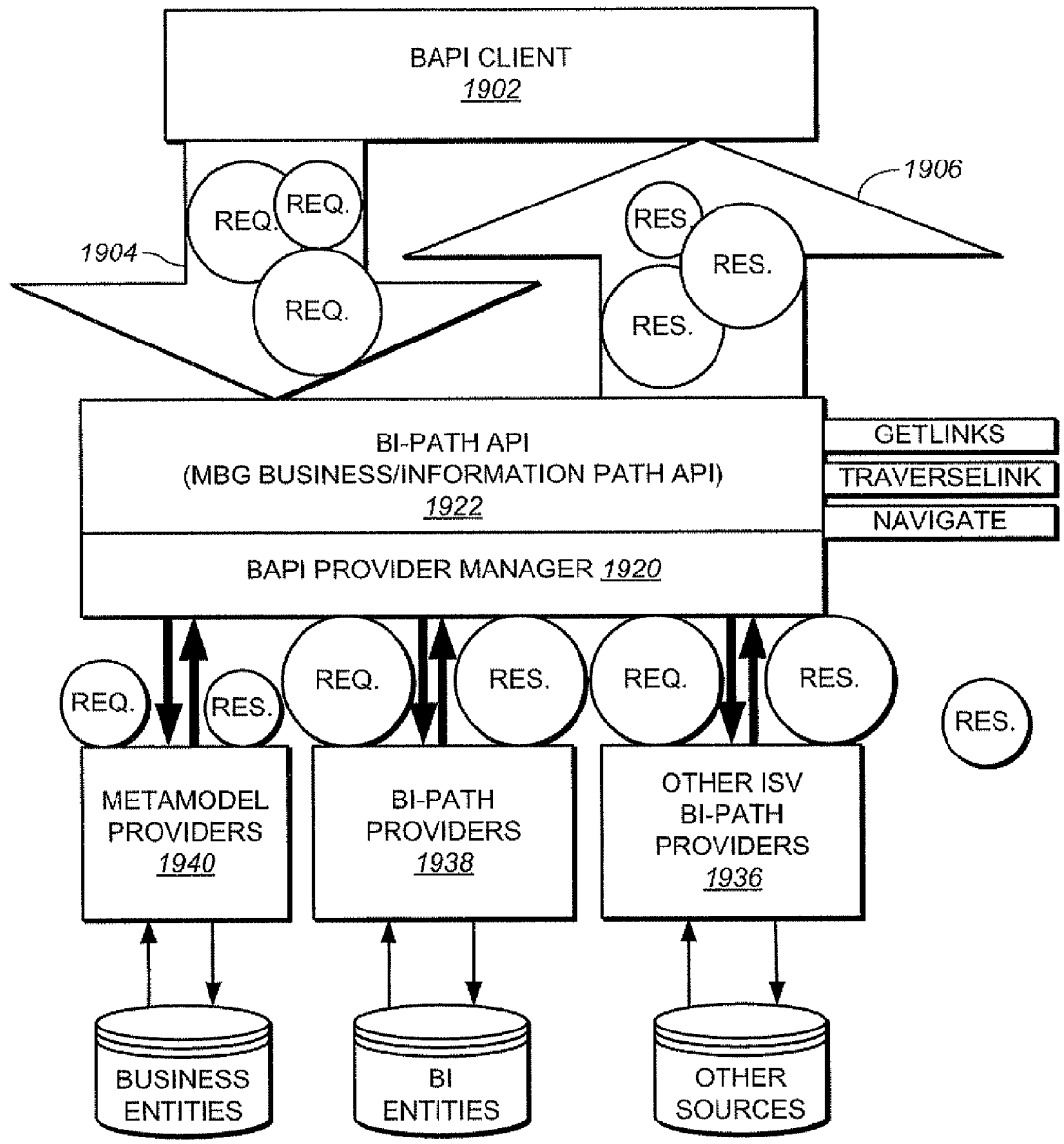
FIG. 31 is a block diagram illustrating an embodiment of a navigation service architecture.

FIG. 31 is a simplified block diagram illustrating the described navigation service architecture. As illustrated, a BAPI client 1904 sends Requests 1904 through API 1922 to BAPI provider manager 1920. In accordance with one embodiment, the Request in sent in the form of a "GetLinks ( )" request to API 1922. BAPI provider manager 1920 either delegates the request to a corresponding provider (or providers) or broadcasts the request to multiple providers (e.g., all providers).

Within FIG. 31, the providers are generically listes as providers 1940 (e.g., providers that provide navigation paths based on business entity information), providers 1930 (e.g., providers that provide navigation paths based on BI Entity enformation), and providers 1936 (e.g., other ISV providers including providers that provide navigation paths based on "other" sources).

As is illustrated, requests are delegated (or broadcast) to providers 1940, 1938 and 1936, which respond with a response. In accordance with block 1906, the responses are then provided to BAPI client 1902 in an aggregated form (aggregation is optional). In accordance with one embodiment, the responses are provided to client 1902 in the form of a collection of links. A link is selected by a user of the client and a corresponding "TraverseLink( )" command is sent to API 1922. A corresponding navigation command is then sent to one or more providers so as to produce a data result, which is provided to client 1902.

It should be emphasized that the Request/Response objects can be extended by users. For example, each provider is configured to generate potentially different Requests/Responses (e.g., exemplified in FIG. 31 by the different sizes of response circles).

Figure 32:
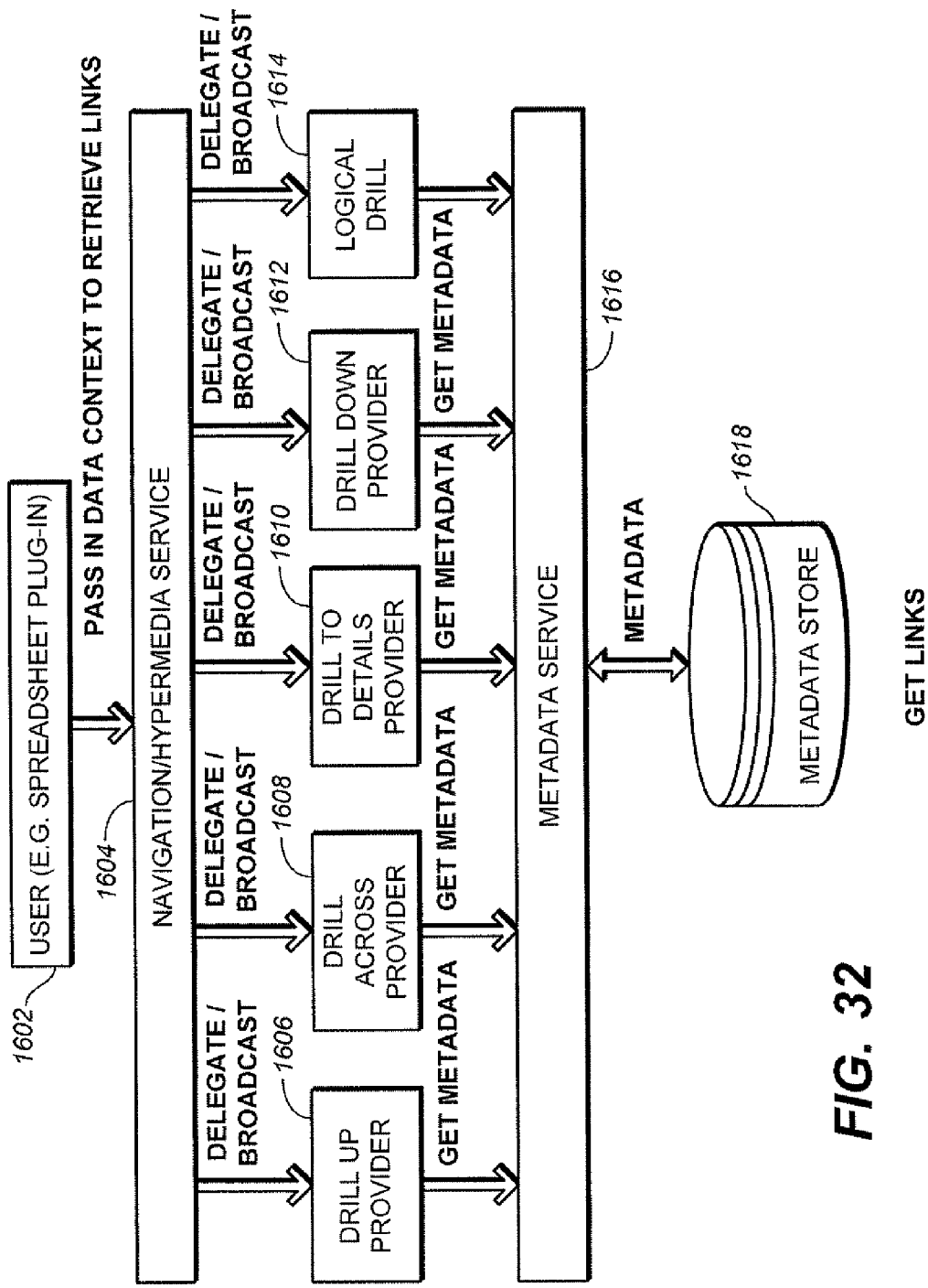
FIG. 32 is a combination block-flow diagram illustrating a process of collecting navigation links.

As was described above in relation to FIG. 29, the process of intelligent data navigation includes generation of a plurality of data navigation links available for a data context received from the user. FIG. 32, in accordance with one aspect of the present invention, is a combination block-flow diagram illustrating the process of collecting available navigation links in association with the described system architecture.

The process illustratively begins when a user 1602 interacts with a data navigation program (e.g., a plug-in navigation application implemented within a main application such as a spreadsheet or other application). Through the interaction, the user illustratively passes to a navigation service 1604 a data context and request for navigation links. Navigation service 1604 illustratively delegates (or broadcasts) a request for links to each of a plurality of navigation providers 1606-1614. Each navigation provider 1606-1614 is illustratively configured to support a different type of data navigation path. Each navigation provider interacts with metadata service 1616 to review information within metadata store 1618 (e.g., store 1100 in FIG. 27) based on the data context provided by the user to service 1604 to identify navigation paths of its own respective type. Each navigation provider 1606-1614 then returns a list of links to service 1604, the list of links corresponding to navigation paths available for the provider's respective navigation type. Service 1604 illustratively aggregates all available navigation links and provides them to the user 1602.

In accordance with one aspect of the present invention, as has been alluded to, as opposed to delegating a request for links to a suitable navigation provider, the request can instead be broadcast to multiple providers. In accordance with one embodiment, no navigation type is specified by a client in a broadcast request object. The clients do not specify a type so that the request will be broadcasted to multiple providers (e.g., all registered providers). The providers that kow about the request will illustratively respond while other providers will not. This is different than the "delegating" scenario.

Figure 33:
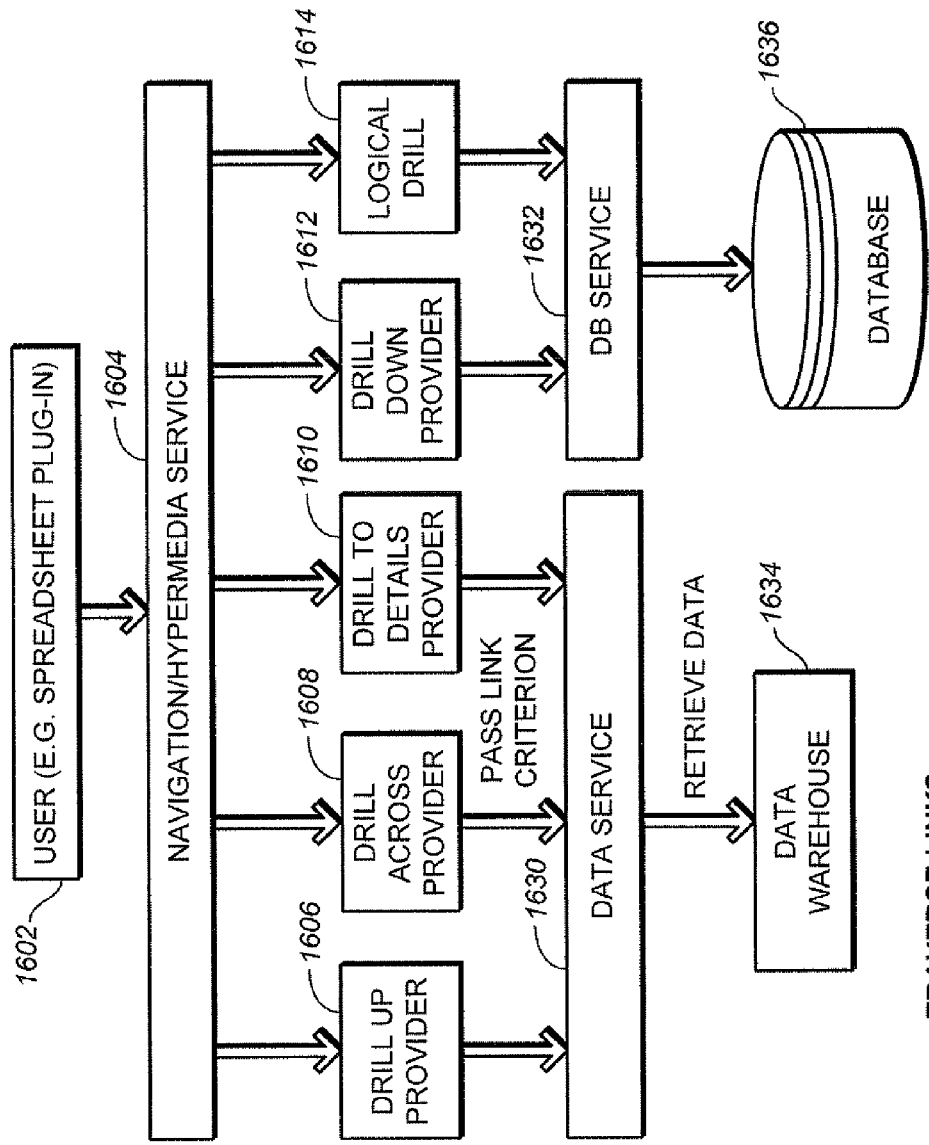
FIG. 33 is a combination block-flow diagram illustrating a process of traversing one particular navigation link.

As was described above in relation to FIG. 29, the described process of intelligent data navigation also includes a user executing or traversing one particular link from the received aggregated list of links. FIG. 33, in accordance with one aspect of the present invention, is a combination block-flow diagram illustrating the process of traversing one particular navigation link in association with the described system architecture.

The FIG. 33 process begins with user 1602 selecting one of the available navigation links returned in response to his/her request for navigation. The selected link is provided to the navigation provider 1606-1614 to which it corresponds. In the illustrated example, the link is provided to drill across provider 1608. The provider that receives the link passes criterion related to the link to either data service 1630 or database service 1632. Service 1630 serves providers that will provide data warehouse (e.g., data warehouse 210) information to the user, while service 1632 services providers that will provide database (e.g., database 231) information to the user. Based on the received criterion, service 1630 or 1632 will interact with either data warehouse 1634 or database 1636, respectively, to obtain the information that corresponds to the navigation destination associated with the link. The information, which is illustratively the executed navigation, is provided to user 1602 through service layer 1604.

In accordance with one aspect of the present invention, the metadata in the metadata store (e.g., store 1100 in FIG. 27) is maintained in an XML format.

In accordance with one embodiment, the interface with which navigation providers interact to provide the described intelligent navigation capability can illustratively be described as follows:

<<interface>>
Navigation Service Provider

+GetProviderInfo ([in]providerInfoRequest:XmlElement): XmlElement

+GetDrillPath ([in]DrillPathRequest:XmlElement):XmlElement

+TraverseLink([in]TraversReuest:XmlElement):XmlElement

+Navigate (NavigateRequest:XmlElement): XmlElement

...

Figure 34:
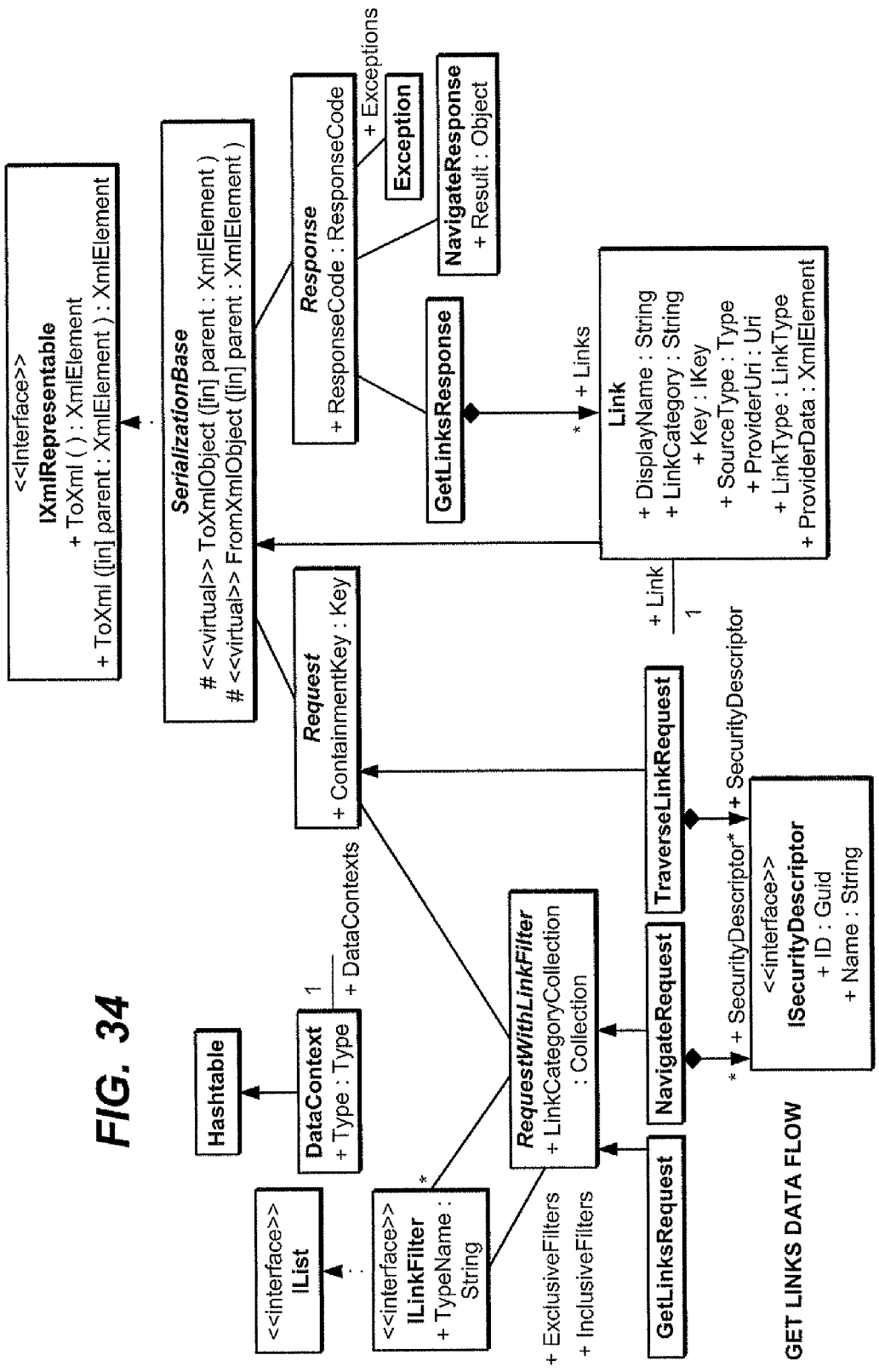
FIG. 34 is a request/response class diagram that pertains to a process of acquiring links in response to a user request for intelligent data navigation, and to a process of traversing a link selected by the user.

Finally, in accordance with one aspect of the present invention, FIG. 34 is an exemplary request/response class diagram that pertains to the processes associated with acquiring links in response to a user request for intelligent data navigation, and to the process of traversing one of the links selected by the user. As is illustrated, the processes are routed through a serialization base associated with an XML interface. It should be noted that the configuration of FIG. 34 is but one example of a system that is suitable to support the described intelligent navigation capabilities.

In accordance with one aspect of the present invention, following are a listing of code snippets that illustrate one exemplary implementation of the described extensible system.

The first code snippet (a) describes in code an example process of acquiring a listing of navigation links, and then traversing a navigation link. Comments denoted within the code snippet with "//" explain the functionality of each line of code.

a. Get Links and Traverse Link

//init INavigateProxy

INavigateProxy navigateproxy= . . . ;

//create get links request

GetLinksRequest getLinksRequest=new GetLinksRequest( );

//set containment key getLinksRequest.ContainmentKey=

//add data context getLinksRequest. DataContext.Add("Microsoft. EntityTests.Customer.CustomerID", 01963656");

//create a link filter getLinksRequest. InclusiveFilters.Add(typeof(Microsoft. EntityTests. Sales), "TurnOver", "Profit")

//set link categories getLinksRequest.LinkCategoryCollection.Add("Microsoft. BusinessFramework.IntelliDrill.DrillUp");

//send get links request

GetLinksResponse getLinksReponse=navigateProxy.GetLinks(getLinksRequest);

//traverse the link if a link is returned

TraverseLinkRequest traverseLinkRequest=new TraverseLinkRequest( );

traverseLinkRequest.Link=getLinksReponse.Links[0];

traverseLinkRequest.ContainmentKey= . . . ;

traverseLinkRequest.SecurityDescriptor= . . . ;

//send traverse link request

NavigateResponse navigateResponse=navigateProxy.TraverseLink (traverseLinkRequest);

//get dataset back

DataSet dataset=(DataSet) navigateResponse.Result;

The code snippet listed in part (a) assumes a scenario wherein, in response to a Request, a user is provided with a plurality of links. In accordance with one embodiment, the user simply asks for a link (or a type of link) and is directly provided a result. In essence, the GetLinks and TraverseLink processes are combined into a consolidated function. This consolidated function is illustratively called a Navigate function. Snippet (b) described a Navigate function.

b. Navigate

//init INavigateProxy

INavigateProxy navigateProxy= . . . ;

//create navigate request

NavigateRequest navigateRequest=new NavigateRequest( );

//set containment key navigateRequest.ContainmentKey= . . . ;

//add data context navigateRequest.DataContext.Add("Microsoft.EntityTests.Customer.CustomerID", "01963656");

//create a link filter navigateRequest.InclusiveFilters.Add(typeof(Microsoft.EntityTests.Sales), "TurnOver", "Profiit")

//set link categories navigateRequest.LinkCategoryCollection.Add("Microsoft. BusinessFramework.IntelliDrill.DrillUp");

//set security descriptor navigateRequest.SecurityDescriptor= . . . ;

NavigateResponse navigateResponse=navigateProxy.Navigate(navigateRequest);

//get dataset back

DataSet dataset=(DataSet) navigateResponse.Result;

In accordance with one aspect of the present invention, in order to support new providers, a flexible architecture is provided wherein Request/Response objects are extensible. For example, a user can define tailored instances of GetLinks and other elements so as to extend the base class for new providers. Snippet (c) demonstrates the flexible architecture.

c. Request/Response Extensibility

Note: Request/Response Extensibility can illustratively be implemented by either extending the base class or using property bag.

public class MyGetLinksRequest:GetLinksRequest { public MyGetLinksRequest(XmlElement request):base(request){ . . . } public String MyProperty.{ . . . }

. . .

} public class MyTraverseLinkRequest:TraverseLinkRequest

{

. . .

}

```
public class MyNavigateRequest:NavigateRequest
{
...
}
public class MyNavigateResponse:NavigateResponse
{
...
}
```

In accordance with one aspect of the present invention, the extensible architecture extends to provider functionality. Snippet (d) is an example.

d. Provider Extensibility

```
public class MyNavigateProvider:INavigateProvider
{
public XmlElement GetLinks(XmlElement request)
{
//get object model from xml element
MyGetLinksRequest getLinksRequest=
new MyGetLinksRequest(request);
//do whatever with the request object
...}
public XmlElement GetLinks(XmlElement request)
{
...
}
public XmlElement GetLinks(XmlElement request)
{
...
}
public String LinkCategory
{
Get
{
return "Microsoft.BusinessFramework.IntelliDrill.MyDrillType";
}
}
}
```

Snippet (e), in accordance with one aspect of the present invention, demonstrates how the extended architecture is implemented within the original system to enable extended functionality for new providers.

e. Extensibility usage

```
//init INavigateProxy
INavigateProxy navigateproxy=...;
//create get links request
MyGetLinksRequest getLinksRequest=new MyGetLinksRequest();
//set containment key
getLinksRequest.ContainmentKey=...;
//add data context
getLinksRequest.DataContext.Add("Microsoft.EntityTests.Customer.CustomerID", "01963656");
//create a link filter
getLinksRequest.InclusiveFilters.Add(typeof(Microsoft.EntityTests.Sales), "TurnOver", "Profit")
//set link categories
getLinksRequest.LinkCategoryCollection.Add("Microsoft.BusinessFramework.IntelliDrill.MyDrillType");
//set property for the extended request
getLinksRequest.MyProperty=...;
//send get links request
GetLinksResponse
getLinksReponse=navigateProxy.GetLinks(getLinksRequest);
```

It can thus be seen that the present invention provides a number of significant advantages over prior systems. One aspect of the present invention automatically generates a dimensional model from an object model. The automatic generation is performed by inferring the dimensional model from relationships specified in the object model and user-designated focal points, as well as mappings back to the relational database.

In another embodiment of the present invention, objects are provided to abstract away from the specifics of a dimensional model. Therefore, a user can access a dimensional model using only object oriented expressions, without requiring specific knowledge of any dimensional model querying language.

Of course, in another embodiment of the present invention, both systems are used together such that the dimensional model is automatically created from a user-specified object model, and the entities which abstract away from the dimensional models are automatically created as well. Thus, all a user must do is provide the focal points, a description of the object model and its persistent data storage mappings, and this embodiment of the present invention automatically generates the necessary components for the user to access the data according to a desired reporting structure using only object oriented expressions without going through the laborious tasks of manually creating a dimensional model and then generating dimensional model-specific queries against the dimensional model.

Similarly, navigation is provided. A user can navigate between and among transactional and analytical representations of the data.

Although the present invention has been described with reference to particular embodiments, workers skilled in the art will recognize that changes may be made in form and detail without departing from the spirit and scope of the invention.

What is claimed is:

1. A computer-readable storage medium having computer-readable program instructions embedded therein for directing operation of a processor associated with a computer system, wherein the computer-readable program instructions, when executed by the processor on the computer system, enable the processor to implement a data processing system, that comprises:

a model service system configured to receive, as an input, an object model description, indicative of a first object model that represents business data, and generate a dimensional model based on the input;

an entity generator generating a second object model based on the dimensional model, the second object model representing business data represented by the dimensional model; and a navigation service configured to identify a data navigation path from relationships between individual sets of data that comprise the business data, and output the data navigation path for navigation by a user from a first data set to a related second data set wherein the navigation service comprises:

a plurality of navigation providers each associated with a specific type of navigation;

a navigation service layer configured to transmit a navigation service request to one or more of the navigation providers that are registered with the navigation service layer; and a metadata service for providing the plurality of navigation providers with access to a metadata store, each navigation provider being configured to respond to a received data navigation request by interacting with the metadata service to identify at least one data navigation path and to return the at least one identified data navigation path to the navigation service layer for output to the user.

2. The computer-readable storage medium of claim 1 wherein the first object model represents transactional business data.

3. The computer-readable storage medium of claim 2 wherein the second object model represents aggregated business data.

4. The computer-readable storage medium of claim 3 wherein the navigation service identifies data navigation paths between the transactional and aggregated business data.

5. The computer-readable storage medium of claim 1 wherein the computer-readable program instructions enable the processor to implement the data processing system that further comprises:

a data accessing system providing an interface to access the business data through the second object model.

6. The computer-readable storage medium of claim 5 wherein the data accessing system is configured to receive an object oriented query expression expressed in terms of entities in the second object model, and wherein the data accessing system comprises:

a translation component configured to translate the object oriented query expression into a dimensional model query expression and execute it against the dimensional model.

7. The computer-readable storage medium of claim 1 wherein the object model description describes a relationship between entities in the first object model and wherein the model service system comprises:

a dimensional model construction system configured to receive, as inputs, the object model description and a focal point identifier identifying information in the object model as a focal point; and a map system configured to receive, as an input, mapping information indicative of a mapping between entities in the first object model and a persistent data store.

8. The computer-readable storage medium of claim 1 wherein at least one of the plurality of navigation providers is associated with navigation from aggregated data to related transaction data.

9. The computer-readable storage medium of claim 1 wherein at least one of the plurality of navigation providers is associated with navigation from transaction data to related aggregated data.

10. The computer-readable storage medium of claim 1 wherein at least one of the plurality of navigation providers is associated with navigation between two data units that share a dimension.

11. The computer-readable storage medium of claim 1 wherein at least one of the plurality of navigation providers is associated with hierarchical navigation through collections of data that are hierarchically organized.

12. The computer-readable storage medium of claim 1 wherein at least one of the plurality of navigation providers is associated with navigation between two data collections that the user has identified as related.

13. A computer-readable storage medium having computer-readable program instructions embedded therein for directing operation of a processor associated with a computer system, wherein the computer-readable program instructions include instructions that, when executed by the processor, enable the processor to implement a data processing system for supporting analytical processing of transactional business data by an application, the computer-readable program instructions enabling the processor to implement the data processing system comprising:

a design system configured to receive a transactional object model description describing a transactional object model used in collecting the transactional business data and generate a dimensional model and an analytical programming object model from the transactional object model description, the analytical programming model representing data represented by the dimensional model and the transactional object model; and a navigation service configured to automatically identify navigable paths between data sets in the business data in the system and output the paths for navigation by a user wherein the navigation service is configured to identify navigation paths among data sets in the transactional object model, the dimensional model and the analytical programming object model.

14. The computer-readable storage medium of claim 13 wherein the navigation service identifies data navigation paths between the transactional and analytical business data.

15. The computer-readable storage medium of claim 13 wherein the navigation service further comprises:

a data accessing system providing an interface to access the business data through the analytical programming model.

16. The computer-readable storage medium of claim 15 wherein the data accessing system is configured to receive an object oriented query expression expressed in terms of entities in the analytical programming model, and wherein the data accessing system comprises:

a translation component configured to translate the object oriented query expression into a dimensional model query expression and execute it against the dimensional model.

17. The computer-readable storage medium of claim 13 wherein the transactional object model description describes a relationship between entities in the transactional object model and wherein the design system comprises:

a model service configured to receive, as inputs, the transactional object model description, a focal point identifier identifying information in the transactional object model as a focal point, and mapping information indicative of a mapping between entities in the transactional object model and a persistent data store.

18. The computer-readable storage medium of claim 17 wherein the navigation service comprises:
- a plurality of navigation providers each associated with a specific type of navigation;
- a navigation service layer configured to transmit a navigation service request to one or more of the navigation providers; and
- a metadata service for providing the plurality of navigation providers with access to a metadata store, each navigation provider being configured to respond to a received data navigation request by interacting with the metadata service to identify at least one data navigation path.

19. The computer-readable storage medium of claim 18 wherein at least one of the plurality of navigation providers is associated with navigation from aggregated data to related transaction data.

20. The computer-readable storage medium of claim 18 wherein at least one of the plurality of navigation providers is associated with navigation from transaction data to related aggregated data.

21. The computer-readable storage medium of claim 18 wherein at least one of the plurality of navigation providers is associated with navigation between two data units that share a dimension.

22. The computer-readable storage medium of claim 18 wherein at least one of the plurality of navigation providers is associated with hierarchical navigation through collections of data that are hierarchically organized.

23. The computer-readable storage medium of claim 18 wherein at least one of the plurality of navigation providers is associated with navigation between two data collections that the user has identified as related.

* * * * *